US005782317A

United States Patent [19]

Lutz

[11] Patent Number: 5,782,317
[45] Date of Patent: Jul. 21, 1998

[54] TRANSPORT APPARATUS FOR VERTICALLY MOVING OBJECTS AND METHOD

[75] Inventor: David W. Lutz. Carlisle. Pa.

[73] Assignee: Master Manufacturers, Inc., Carlisle. Pa.

[21] Appl. No.: 633,159

[22] Filed: Apr. 16, 1996

[51] Int. Cl.⁶ .................................................. B66B 9/02
[52] U.S. Cl. ......................................... 187/270; 414/222
[58] Field of Search ............................ 187/270, 249, 187/240, 244; 414/222, 225, 226, 750

[56] References Cited

U.S. PATENT DOCUMENTS

| 2,010,732 | 8/1935 | Mandusic | 271/88 |
|---|---|---|---|
| 2,092,430 | 9/1937 | Stratton | 312/184 |
| 3,418,895 | 12/1968 | Palmer | 93/93 |
| 3,447,697 | 6/1969 | Morey et al. | 214/8.5 |
| 3,643,816 | 2/1972 | Jacobsen | 214/6 H |
| 3,876,097 | 4/1975 | Svenson et al. | 214/514 |
| 4,058,225 | 11/1977 | Janson | 214/6 P |
| 4,143,780 | 3/1979 | Schnell | 414/620 |
| 4,277,216 | 7/1981 | Lindberg | 414/331 |
| 4,325,666 | 4/1982 | Chain et al. | 414/24.5 |
| 4,373,846 | 2/1983 | Charbonnet | 414/331 |
| 4,405,186 | 9/1983 | Sandberg et al. | 414/21 |
| 4,460,169 | 7/1984 | Bartesaghi | 271/192 |
| 4,557,656 | 12/1985 | Ouellette | 414/43 |
| 4,588,341 | 5/1986 | Motoda | 414/32 |
| 4,687,403 | 8/1987 | Motoda | 414/32 |
| 4,946,340 | 8/1990 | Murphy | 414/788.8 |
| 5,020,382 | 6/1991 | Lutz | 74/89.2 |
| 5,096,369 | 3/1992 | Ouellette | 414/788.7 |
| 5,180,277 | 1/1993 | Pearce et al. | 414/792.7 |
| 5,190,434 | 3/1993 | Miura et al. | 414/609 |
| 5,207,727 | 5/1993 | Pearce et al. | 414/792.7 |
| 5,310,305 | 5/1994 | Lutz | 414/609 |
| B1 4,557,656 | 12/1989 | Ouellette | 414/790.8 |

FOREIGN PATENT DOCUMENTS

| 1238843 | 6/1964 | Germany . |
| 270796 | 10/1993 | Japan . |

OTHER PUBLICATIONS

Electrolux, H1–Lift Order Pickers, Mar. 1990 Materials Handling, p. 20.

Joyce, Materialift LC Series Vertical Reciprocating Conveyors.

*Primary Examiner*—Kenneth Noland
*Attorney, Agent, or Firm*—Thomas Hooker, P.C.

[57] ABSTRACT

A Transport apparatus includes a vertically extending frame, three plate assemblies mounted on the frame and three assembly drives connected to the plate assemblies for vertically moving the plate assemblies in the frame. The frame surrounds a transport column which includes a bottom work position, a middle storage position and a top storage position. Each plate assembly includes a carriage adjacent a side of the frame, a rectangular plate, a hinge between the carriage and plate and a pair of hinge drives for rotating the plate between a horizontal load supporting position in the transport column and a vertical position adjacent the column. The assemblies are lowered to the under position with horizontal plates supporting pallets filled with work parts. After the work parts and pallets are removed, the plates are rotated to the vertical and moved up to storage positions.

26 Claims, 16 Drawing Sheets

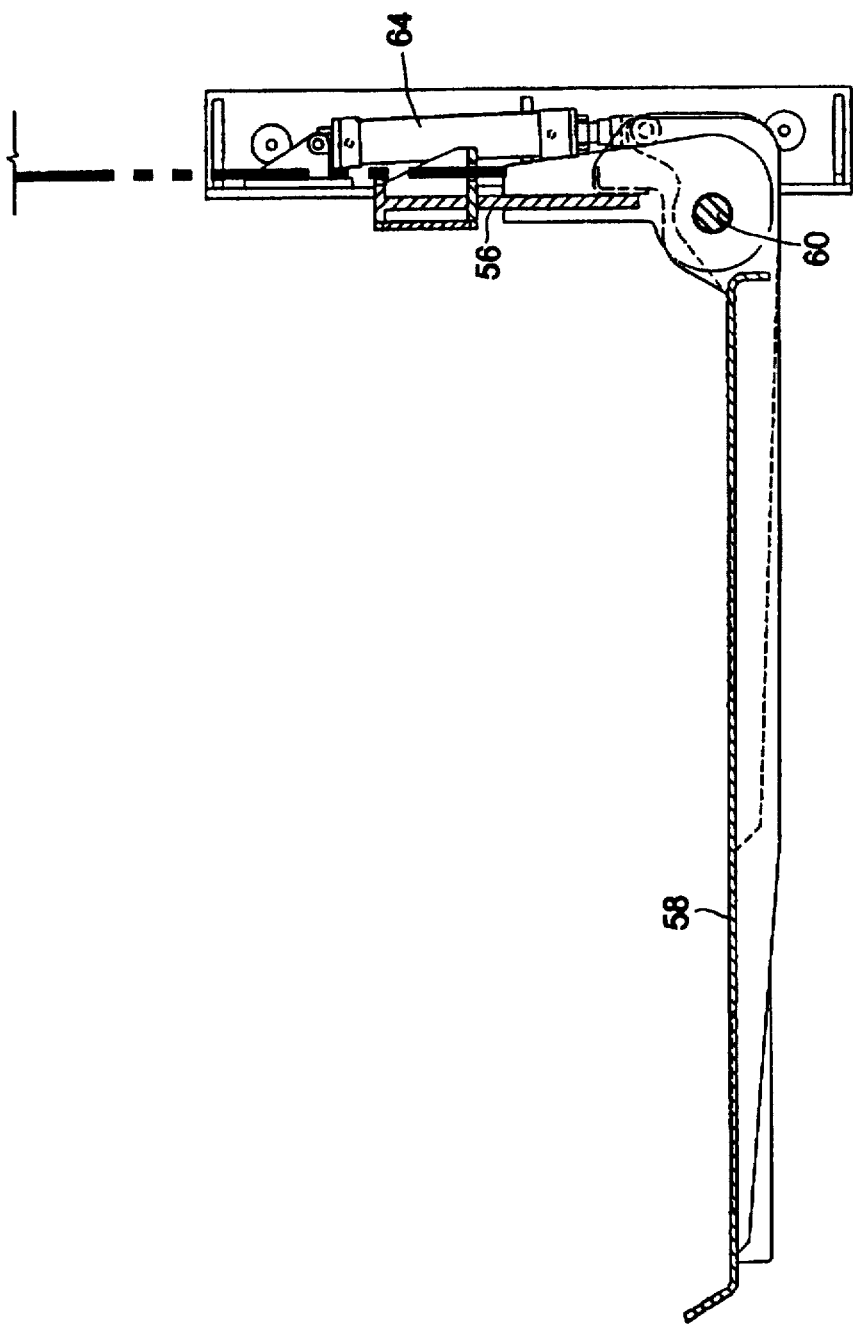

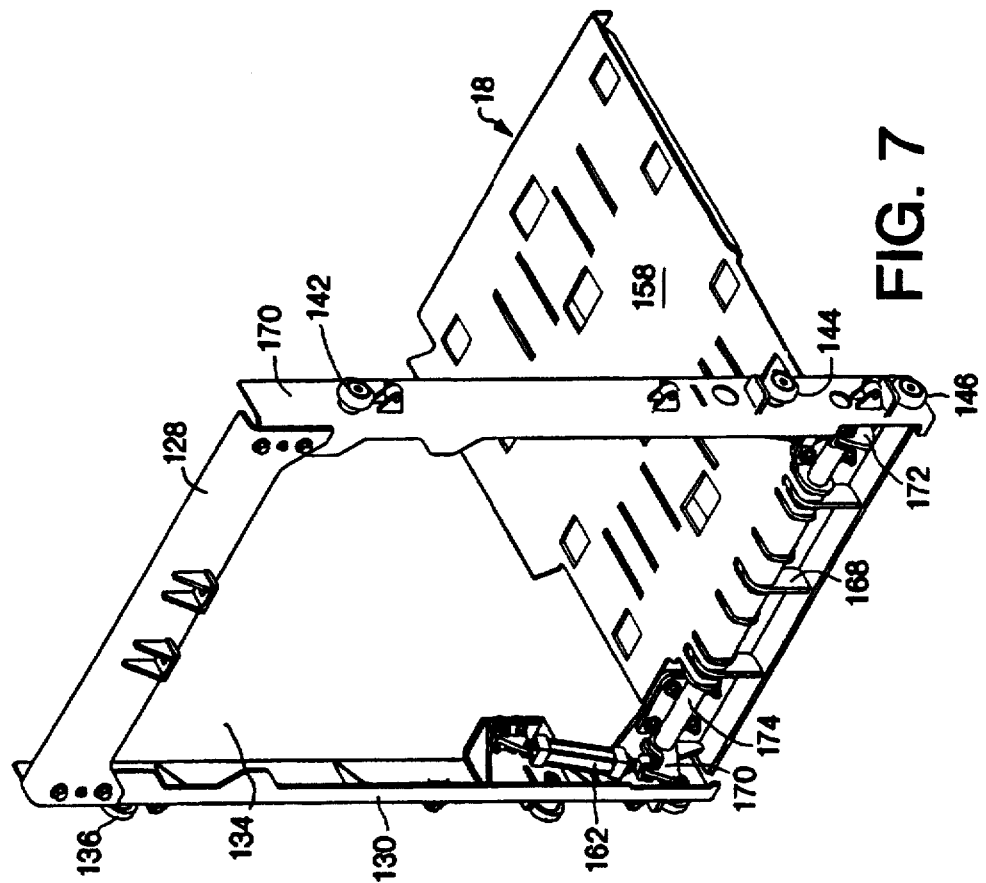
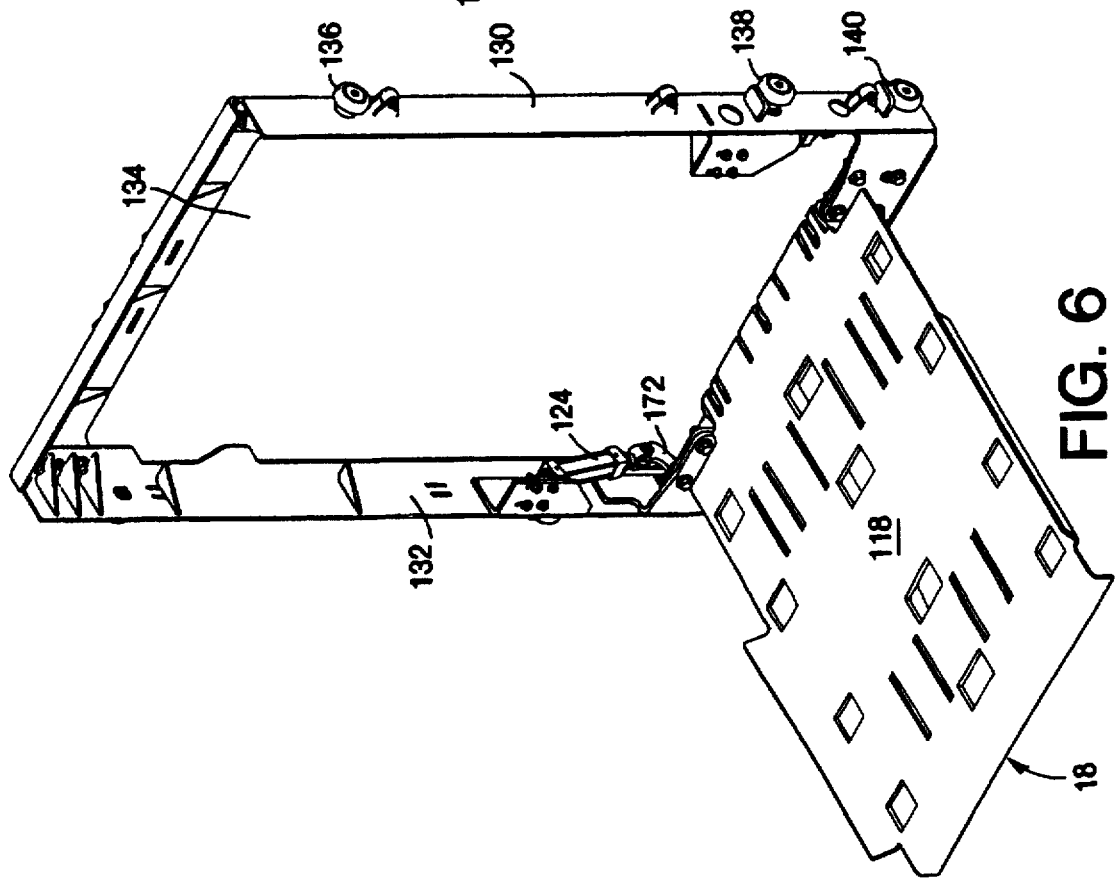

TRANSPORT APPARATUS FOR VERTICALLY MOVING OBJECTS AND METHOD

FIELD OF THE INVENTION

The Invention relates to transport apparatus for repetitively moving objects between a number of vertically spaced transport positions. The invention is used on assembly lines to keep assembly line workers stocked with the necessary work parts which are attached to assemblies moving along the line.

DESCRIPTION OF THE PRIOR ART

Parts are conventionally supplied to assembly line workers on pallets which are stored in two level and three-level pallet racks located on one side of the line adjacent a work station. These racks are relatively narrow, given the close spacing of work stations along the line. The worker picks parts from the pallet at the bottom of the rack and places the parts on assemblies moving along the line. Pallets loaded with parts are placed on the rack at the upper two levels in order to assure that a supply of parts is maintained adjacent the work station for transfer to the lower level when parts are exhausted from the pallet at the lower level.

Loaded pallets on the racks are moved to different positions in the rack using a fork lift truck which is driven along a roadway extending along the side of the racks away from the assembly line. The fork lift trucks load filled pallets in the upper two levels on the rack and, in response to requests from workers, remove empty pallets from the bottom level of the rack and then pick up a full pallet from one of the upper levels and move the pallet to the bottom level. It is essential that these operations be performed promptly in order to assure that the workers always have a supply of parts. If a work station runs out of parts the assembly line must be shut down until parts are resupplied to the station.

The worker is unable to transfer a loaded pallet on the rack to the bottom station but must await the arrival of a fork lift truck to perform this operation. There can be a considerable delay between the time a worker signals that the pallet at the lower work level is empty and an available lift truck can be driven to the opposite side of the rack for removal of the empty pallet and movement of a loaded pallet at an upper level down to the lower level.

The job of supplying work parts to assembly line workers is further complicated because the number of parts carried by a single pallet may vary depending upon the size or weight of the part. This means that there is a greater call for fork lift trucks to service the work stations with pallets carrying a small number of parts than there is for work stations with pallets carrying a larger number of parts.

The problem of supplying work parts to assembly line work stations is further complicated because the work stations are closely spaced together along the length of the line. Parts must be stored above the lower level in pallet racks because there is no available space to either side of the work station.

All of these factors complicate the supply of pallets with work parts to assembly line workers, particularly in assembly lines where the delay or misplacement of a single pallet of critical parts could delay or stop production on the entire line. Shutdown of an assembly line of this type because of a lack of work parts is very expensive.

SUMMARY OF THE INVENTION

The invention is a transport apparatus useful on an assembly line for on-demand delivery of loaded pallets to a bottom work position. The apparatus includes a vertically extending frame, a transport column in the frame, a number of vertically movable plate assemblies mounted on the frame and a number of assembly drives connected to the plate assemblies for moving the assemblies up and down the frame.

The frame has an operator side with a work part discharge opening that provides worker access to work parts on a pallet at the bottom work position and an opposed loading side that provides fork lift truck access to the bottom work position and to two elevated storage positions.

The plate assemblies each include a carriage mounted on the frame, a pallet support plate, a hinge connection between the carriage and the support plate and a hinge drive. The hinge drive rotates the plate from a horizontal load-supporting position in the transport column to a retracted vertical position outside the column close to the frame. The assembly drive lowers plate assemblies with horizontal plates carrying loaded pallets down to the bottom work position to supply parts to an assembly line worker on demand.

When all the work parts have been removed from the pallet at the work position, the worker pushes the empty pallet from the work position and actuates the transport apparatus to automatically rotate the empty lower plate to a vertical position at one side of the column and then lower an elevated plate assembly carrying a loaded pallet down the column, past the vertical plate and to the work position to resupply parts to the lower or bottom position. The plate assembly with the vertical plate is raised past the new assembly at the lower position to an elevated position and the vertical plate is then returned to the horizontal to receive a loaded pallet from a supply fork lift truck.

The transport apparatus moves loaded pallets from an elevated storage position down to the bottom work position upon worker demand. Loaded pallets are transfered to the work position automatically and rapidly. There is no need to position a fork lift truck at the back of the frame, lift a loaded pallet from an upper storage position, withdraw the lifted pallet from the frame, lower the pallet on the truck to the bottom position and then move the pallet into the frame and place the pallet in the lower position. On-demand delivery of loaded pallets to the work position reduces assembly line downtime due to a lack of parts.

The transport apparatus is compact with all plate assemblies and associated drives located within the space occupied by a conventional three level or tier pallet frame. The compact design is important because there is very limited space available for pallet storage to one side of a production line.

Other objects and features of the invention will become apparent as the description proceeds, especially when taken in conjunction with the accompanying drawings illustrating the invention, of which there are sixteen sheets and one embodiment.

DESCRIPTION OF THE DRAWINGS

FIG. 5 is a side view of the plate assembly of FIGS. 3 and 4;

FIGS. 6 and 7 are partial perspective views of a plate assembly with an elongate carriage;

FIGS. 14A and 14B–25A and 25B are paired views of the apparatus in different positions illustrating one cycle of operation from the operator side and the right side.

DESCRIPTION OF THE PREFERRED EMBODIMENT

Figure 1:
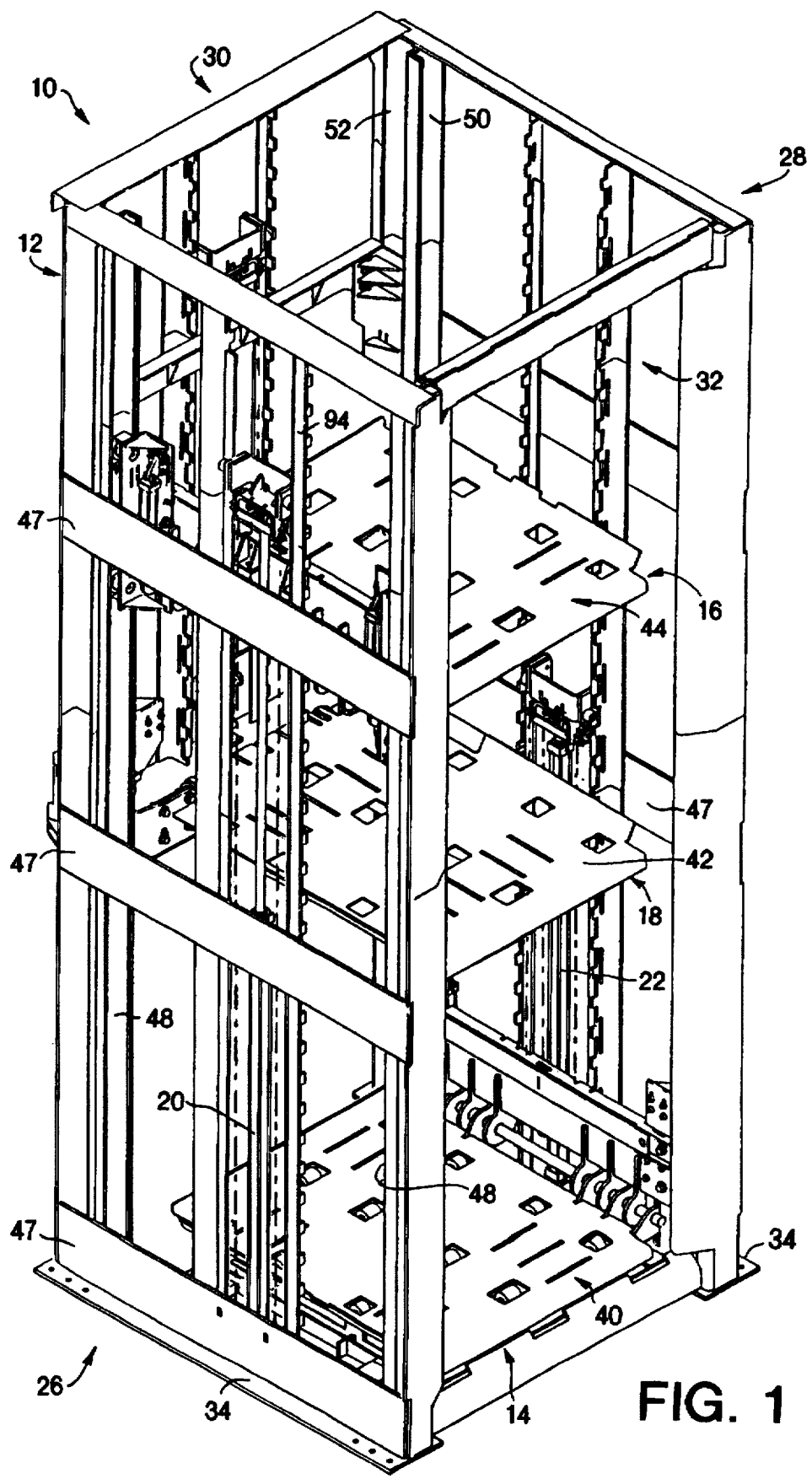
FIG. 1 is a perspective view of the apparatus according to the invention taken from one side.
Figure 2:
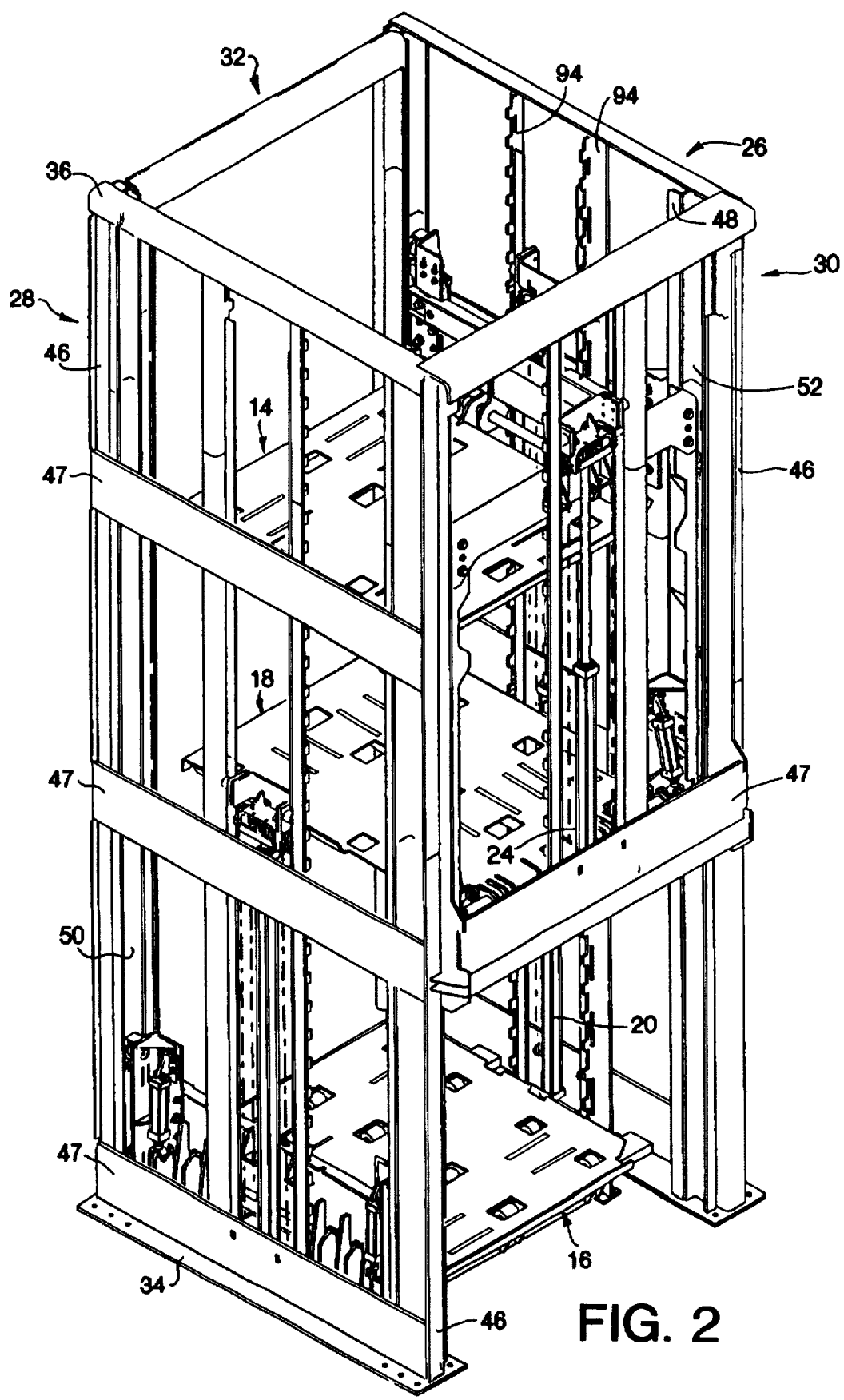
FIG. 2 is a perspective view similar to FIG. 1 taken from the opposite side.

As illustrated in FIGS. 1 and 2, transport apparatus 10 includes a rectangular vertically extending frame 12, three plate assemblies 14, 16 and 18 mounted on the frame 12 and three assembly drives 20, 22 and 24 connected respectively to assemblies 14, 16 and 18 for moving the plate assemblies vertically along frame 12.

Frame 12 includes a right side 26, a left side 28, an operator side 30 and a loading side 32 each extending from frame base 34 to top 36. Frame 12 surrounds and defines vertical transport column 38. Transport column 38 includes a bottom work position 40 adjacent base 34, a middle storage position 42 spaced above bottom work position 40 and a top storage position 44 spaced above middle storage position 42 and below top 36.

Like assembly drives 20 and 22 move like plate assemblies 14 and 16 up and down along transport column 38 between bottom work position 40, middle storage position 42 and top storage position 44. Assembly drive 24 moves plate assembly 18 up and down between bottom work position 40 and middle storage position 42.

Frame 12 includes four elongate corner posts 46 extending from base 34 to top 36, a number of cross members 47 between the posts, and three pairs of opposed vertical U-channels 48, 50 and 52 at the edges of right side 26, left side 28 and operator side 30, respectively. Each U-channel is joined to and extends the full height of frame 12 along one of posts 46.

Figure 3:
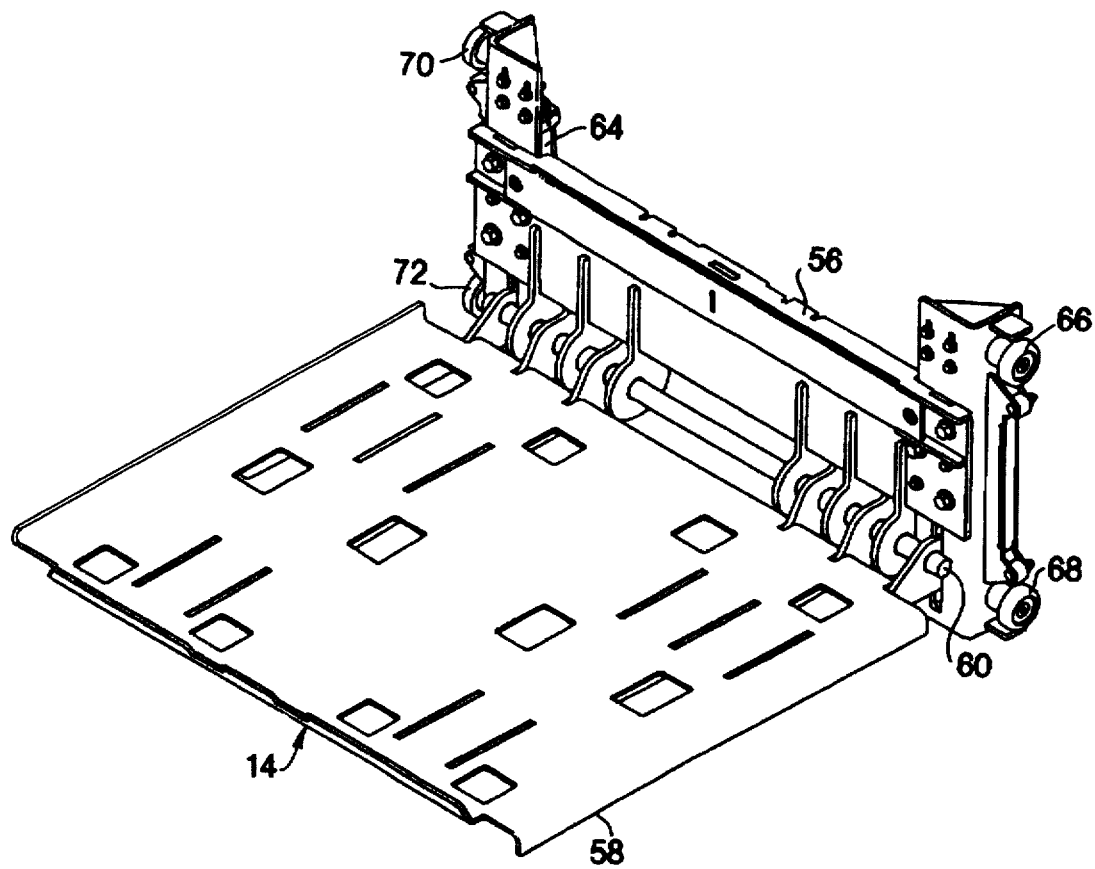
FIGS. 3 and 4 are partial perspective views of a plate assembly taken from opposite sides.
Figure 4:
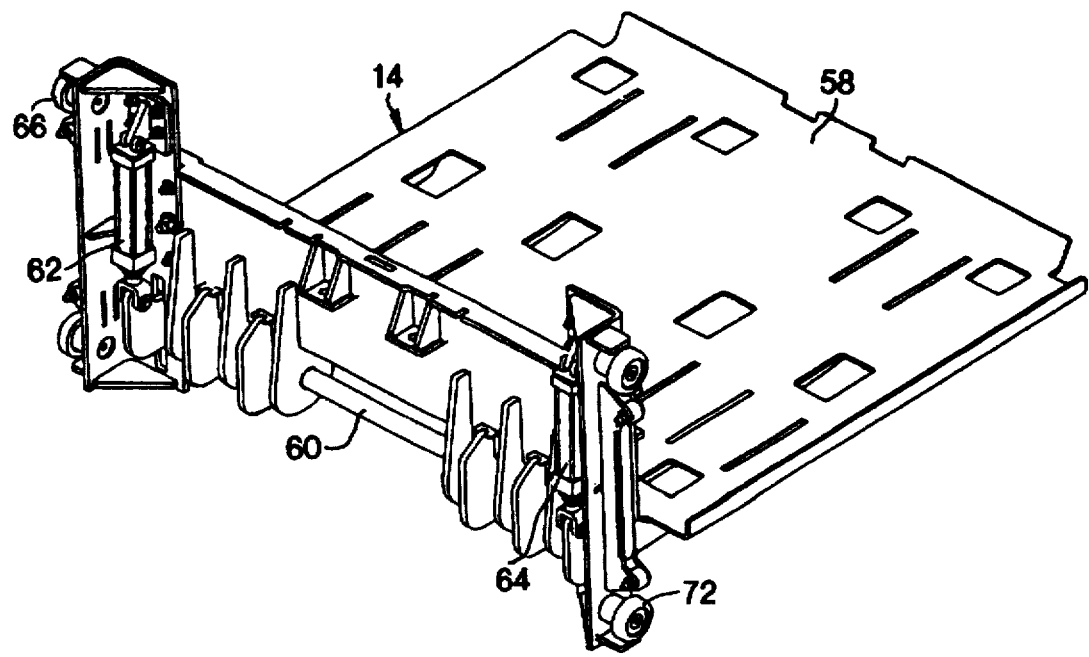
Figure 9:
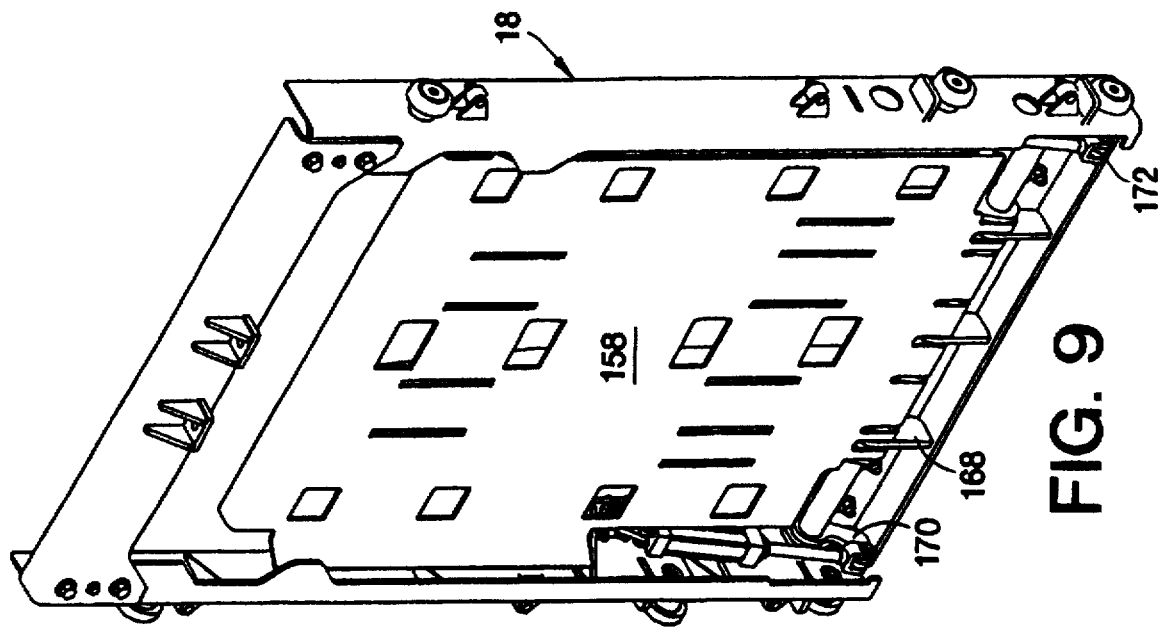
FIGS. 8 and 9 are perspective views of the plate assembly of FIGS. 6 and 7 in a retracted vertical position.
Figure 8:
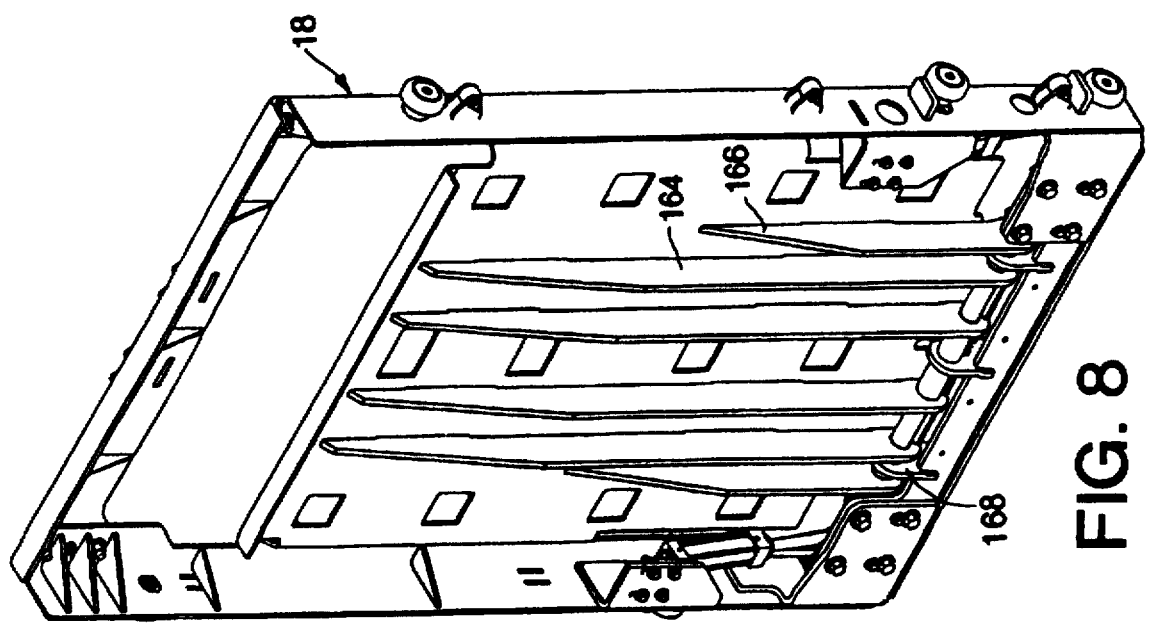
Figure 10:
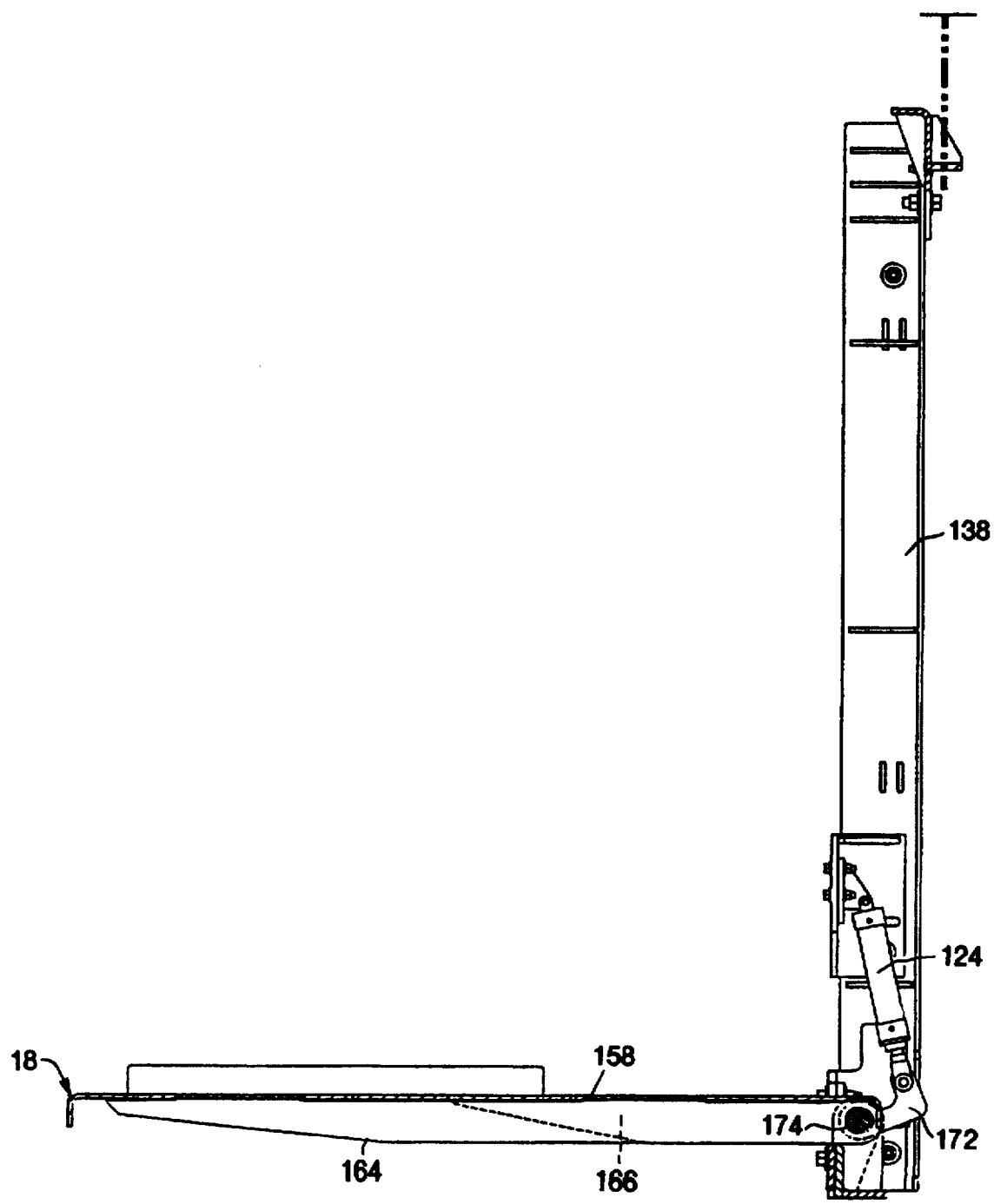
FIG. 10 is a side view of a plate assembly similar to FIGS. 6 and 7.
Figure 11:
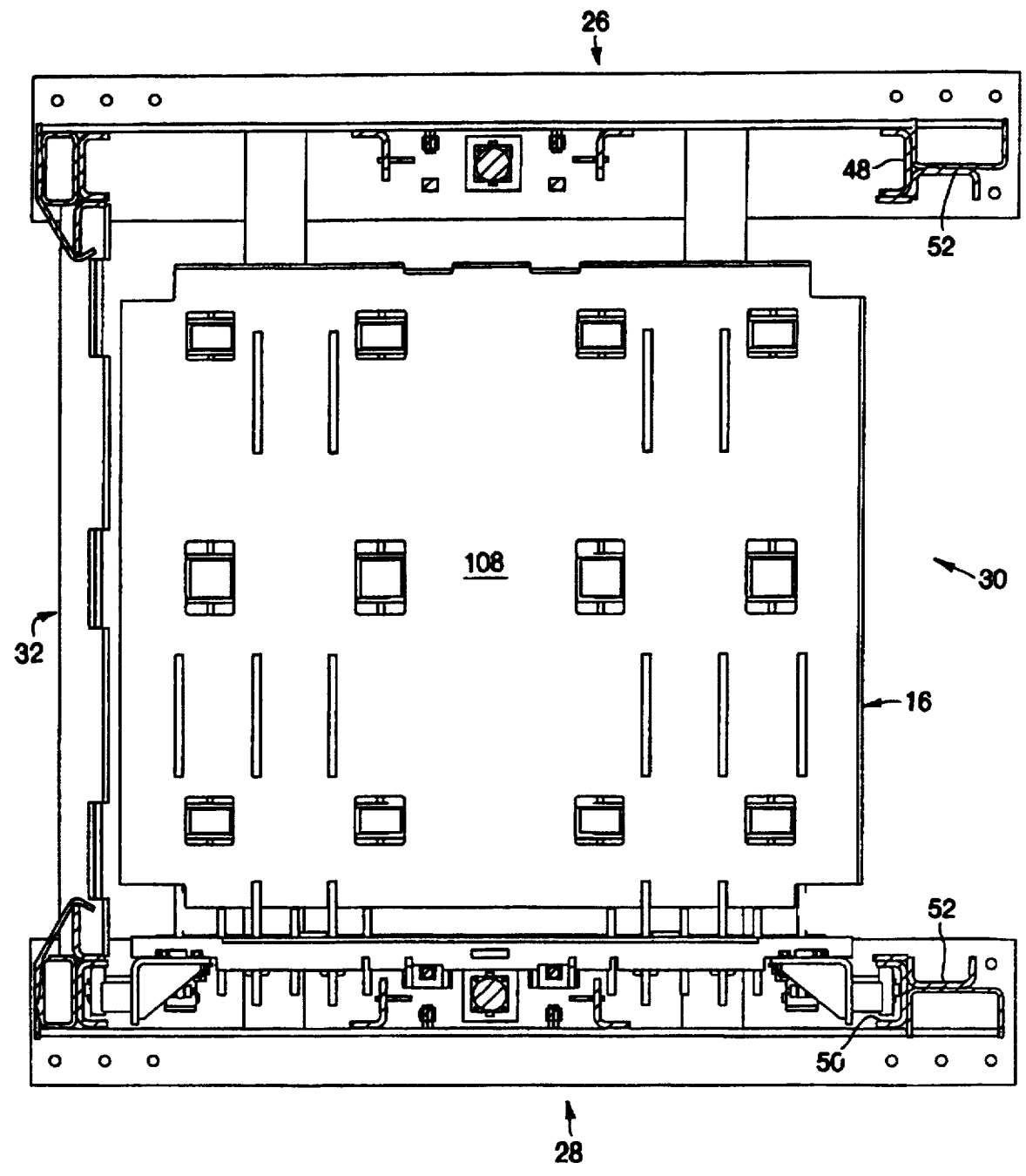
FIG. 11 is a sectional view of the apparatus taken along line 11—11 of FIG. 1.
Figure 12:
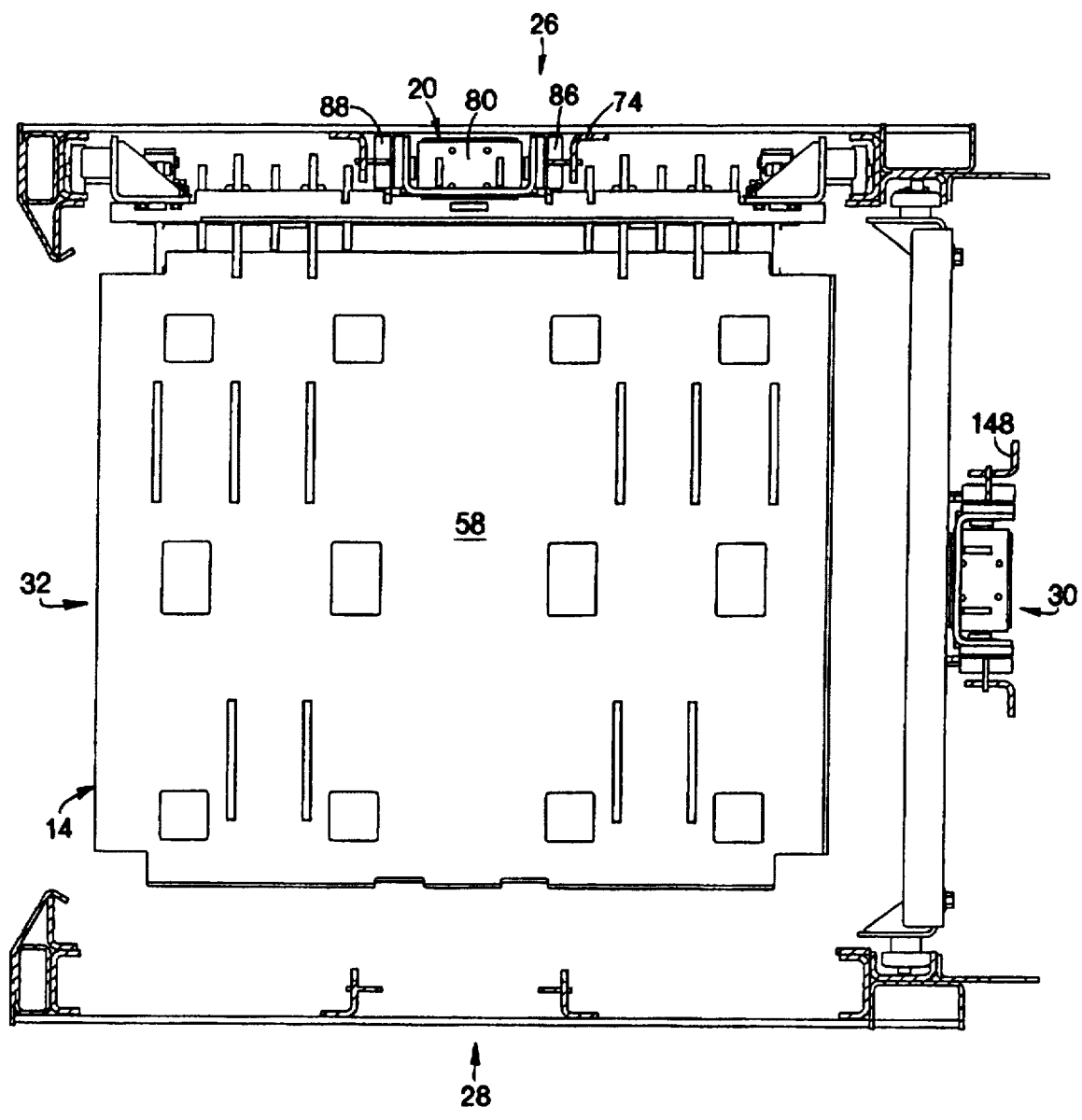
FIG. 12 is a sectional view similar to FIG. 11 taken along line 12—12 of FIG. 1.
Figure 13:
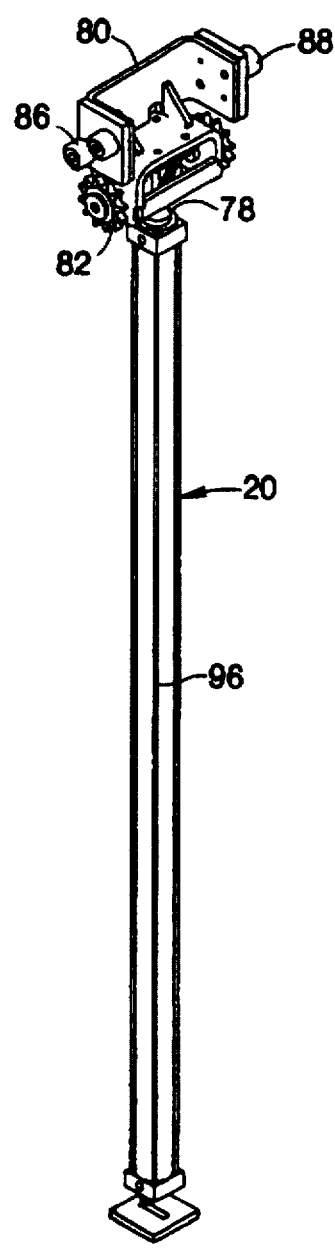
FIG. 13 is a perspective view of an assembly drive.

As shown in FIGS. 3–5, plate assembly 14 includes a vertically moveable carriage 56 extending across side 26 between adjacent pair of U-channels 48, a rectangular plate 58, a horizontal hinge 60 joining plate 58 to carriage 56 and a pair of fluid cylinder hinge drives 62 and 64 mounted on carriage 56 and operable to rotate plate 58 between a horizontal load supporting position in column 38 and a vertical position adjacent the frame and to one side of the column.

Two spaced carriage wheels 66, 68 and 70, 72 are mounted on each opposed end of carriage 56. The wheels run in U-channels 48 to facilitate vertical movement of carriage 56 on the frame. The axis of hinge 60 extends horizontally across the right side 26 of frame 12 and along the carriage 56, to one side of transport column 38. Cylinder drives 62 and 64 connect the plate and carriage a distance outwardly from the hinge to rotate the plate relative to the carriage as described. The drives 62 and 64 are located at the ends of the hinge 60 and do not obstruct the load supporting surface of the plate 58 in column 38. Stops on the carriage 56 support the plate when in the horizontal position. When the plate is in the vertical position, the assembly drive 20 may move plate assembly 14 vertically past the other plate assemblies 16 and 18. Pairs of spaced guide rails 74 are mounted on frame 12 right and left sides 26 and 28 and extend vertically from the base 34 to top 36 of the frame.

Assembly drive 20 includes a hydraulic cylinder 76 having a body mounted on the base 34 between guide rails 74 and a piston rod 78 extending vertically from the body to a lift head 80 on the end of the rod. A pair of idler sprocket gears 82 are mounted on head 80. Assembly drive 20 also includes two like lift chains 84. One end of each chain is secured to a cross member 47 at bottom of the frame. The chains extend up from the cross member, are wrapped around gears 82 on head 80 and extend down from the gears to second ends secured to carriage 56 of plate assembly 14. Extension and retraction of cylinder 76 moves assembly 14 between the bottom, middle and top positions in column 38. Pairs of guide wheels 86 and 88 on head 80 are located to either side of rails 74 and hold the head in place between the rails during raising and lowering of assembly 14. Assembly drive 20 is located entirely within the frame 12. The drive rapidly raises and lowers plate assembly 14 at twice the extension and retraction speed of cylinder 76.

Assembly drive 22 for plate assembly 16 is identical to assembly drive 20 and need not be further described.

As shown in FIGS. 3–5, hinge 60 includes a number of plate ribs 90, 92, 94, 96, 98 and 100 mounted on the bottom of plate 58, a number of carriage ribs 102 mounted on carriage 56 and a hinge pin 104 extending through bores in the free ends of the ribs. Hinge drive cylinders 62 and 64 are connected between the carriage 58 and the free ends of plate ribs 98 and 100 so that extension of the cylinders raises the plate from the horizontal position to the vertical position.

Plate assembly 16 is identical to plate assembly 14 and includes a vertically moveable carriage 106, a rectangular plate 108, a hinge 110 joining plate 108 to carriage 106 and a pair of hinge drives 112 and 114 mounted on carriage 106 and operable to rotate plate 108 like the corresponding members of plate assembly 14 and need not be described further.

As shown in FIGS. 6–10, plate assembly 18 differs from plate assemblies 14 and 16 and includes a vertically moveable rectangular carriage 116 defining a rectangular opening 134, a rectangular support plate 118, a hinge 120 joining plate 118 to the bottom bar of the carriage 116 and a pair of cylinder hinge drives 122 and 124 mounted on carriage 116 and operable to rotate plate 118.

Carriage 116 includes bottom bar 126, top bar 128 and side bars 130 and 132 joining the ends of bottom bar 126 and top bar 128 to form a hollow rectangular frame surrounding the rectangular work part discharge opening 134. Opening 134 extends across the width of operator side 30 of the frame and vertically a distance equal to the distance between the bottom work position 40 and the middle storage position 42. The hollow rectangular frame provides operator access through opening 134 to plate 118 when the carriage 116 is in the bottom work position 40.

Three spaced carriage wheels 136, 138, 140 and 142, 144, 146 are mounted on each opposed ends of carriage 116 and run in U-channels 52 to facilitate vertical movement of carriage 116 on the frame 12.

Assembly drive 24 raises and lowers the assembly 18 between the work and middle positions only. A pair of opposed vertical guide rails 148 on frame 12 extend from a point on the frame 12 adjacent middle storage position 42 to top 36 along operator side 30. The drive 24 includes a hydraulic cylinder 150 having a body mounted on a frame cross member 47 at middle position 42 between rails 148 and a piston rod 152 extending vertically from the body to a lift head 154 on the end of the rod 152. Two pairs of drive wheels 156 and 158 mounted on opposed ends of lift head 154. Each pair 156 and 158 engaging one of rails 148 for guiding vertical movement of cylinder 150 between rails 148. A pair of idler sprocket gears 160 are mounted on head 154 and a pair of chains 162 secured to the cross member 47, wrapped around gears 160 and secured to carriage top bar 126. Extension and retraction of the cylinder 150 raises and lowers the assembly 18 between bottom position 40 and middle position 42. Drive 24 is located entirely within frame 12 and does not obstruct workers access to the bottom work positions.

As shown in FIGS. 6–10, hinge 120 includes a number of long plate ribs 164 and short plate ribs 166 mounted on the bottom of plate 118, a number of carriage ribs 168 mounted on carriage 116, two drive ribs 170 and 172, and a hinge pin 174 extending through bores in the free ends of the ribs. Hinge drive cylinders 122 and 124 are connected between the carriage 116 and the free ends of drive ribs 170 and 172 so that extension of the cylinders raises the plate from the horizontal position to the vertical position to one side of column 35. Stops hold the plate in the horizontal position.

The axies of the plate hinges are located outside of the transport column 38 and inside the frame sides to permit upward rotation of the plates from the horizontal load-carrying position to the vertical position located outside of the column and inside the adjacent frame side. When in the horizontal position, the plates extend across the transport column with the plate edges away from the hinges defining the sides of the column.

Transport apparatus 10 includes a control system (not illustrated) for operating the apparatus in response to operator input. The control system extends and contracts the disclosed power cylinders to cycle the apparatus as described below.

The cycle of operation of transport apparatus 10 will now be described with reference to FIGS. 14A and B through 25A and B. The paired views of these figures show operation of the apparatus 10 from the operator side 30 in the A figure and from the right side 26 in the B figure.

Figure 14B:
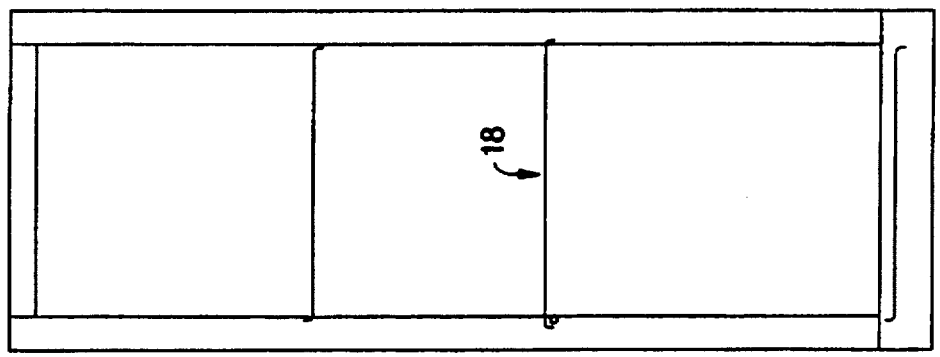
Figure 14A:
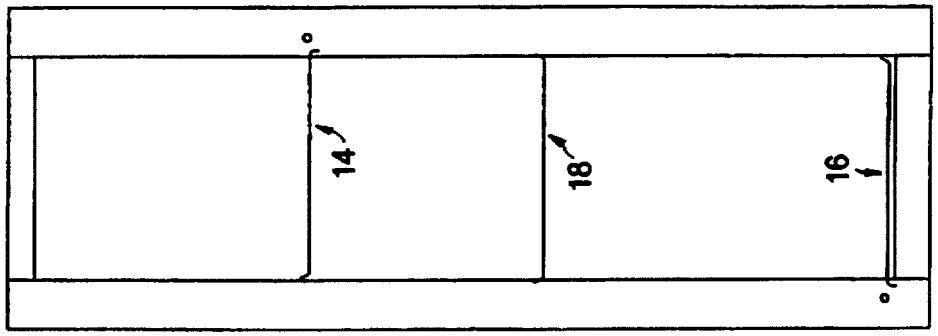

As shown in FIGS. 14A and B, apparatus 10 begins operation with the plates of assemblies 16, 18 and 14 extending into transport column 38 in bottom work position 40, middle storage position 42 and top storage position 44, respectively. Each plate assembly 14, 16 and 18 supports a filled work material pallet (not illustrated).

A worker, standing adjacent operator side 30, reaches into frame 12 through the access opening between bottom work position 40 and middle storage position 42 and removes the work parts from the pallet on plate assembly 16. When all the work parts have been removed from the pallet, the worker pushes the pallet out from frame 12 through loading side 32 and activates the drive control for apparatus 10.

Figure 15B:
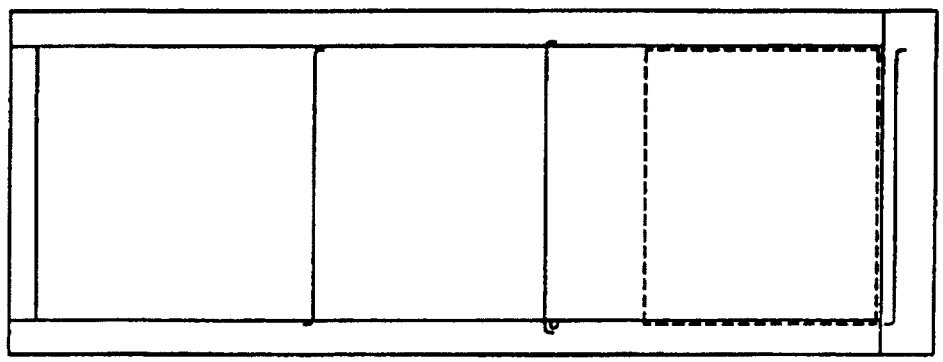
Figure 15A:
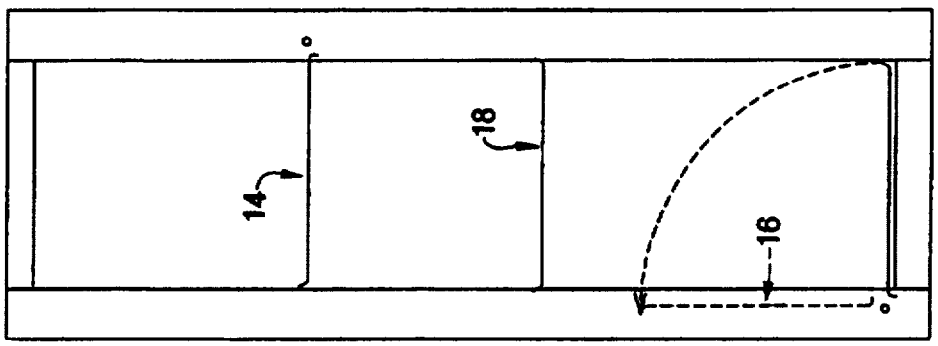

As shown in FIGS. 15A and B, the empty plate of plate assembly 16 is rotated out of transport column 38 by hinge drives 112 and 114 to the retracted vertical position parallel left side 28 and outside column 38.

Figure 16B:
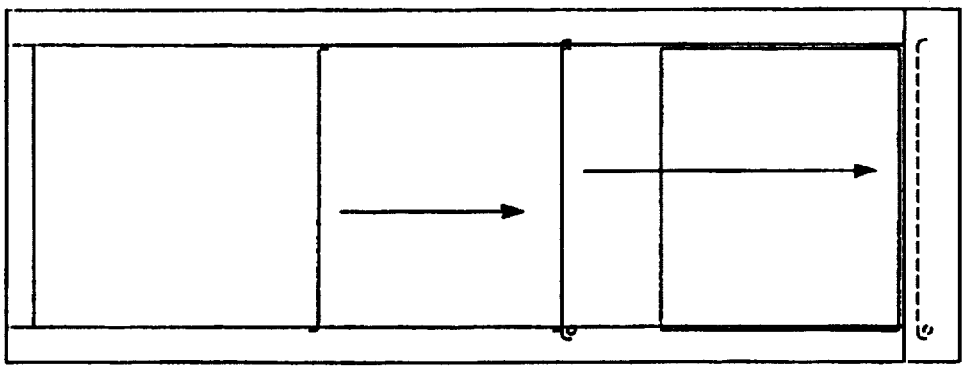
Figure 16A:
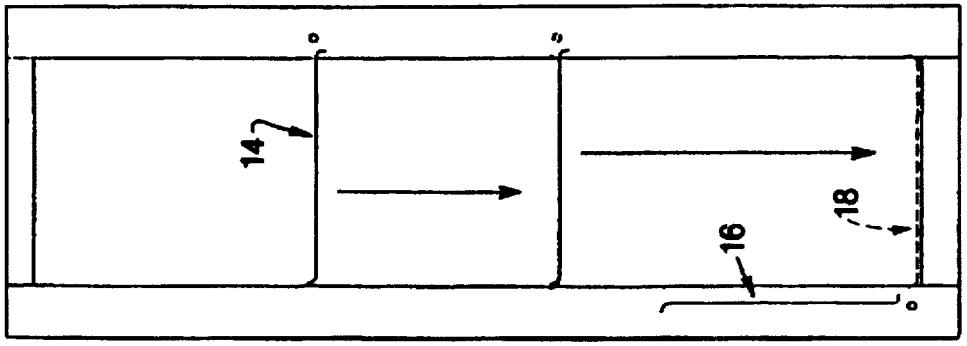

As shown in FIGS. 16A and B, plate assembly 14 is then moved by assembly drive 20 from top storage position 44 to middle storage position 42 and simultaneously plate assembly 18 is moved by assembly drive 24 from middle storage position 42 to bottom work position 40, thereby resupplying work parts to the work positions.

Figure 17B:
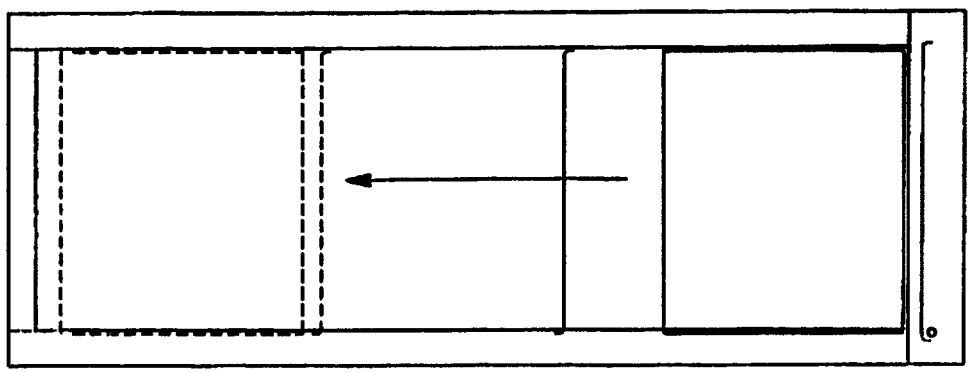
Figure 17A:
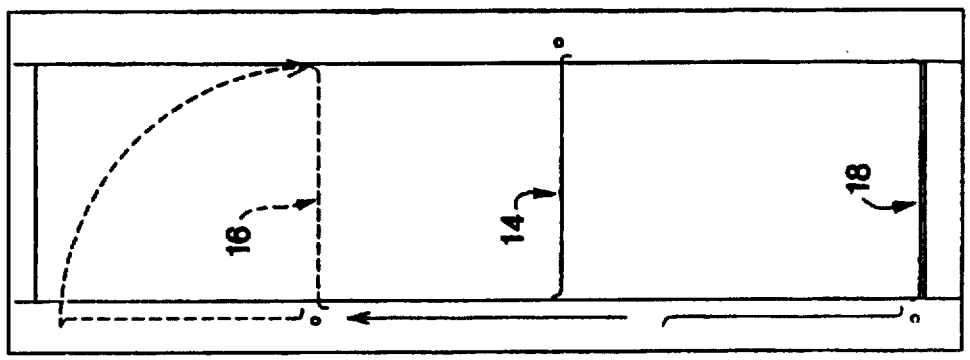

As shown in FIGS. 17A and B, plate assembly 16 is next moved by assembly drive 22 from bottom work position 40 to top storage position 44 and the plate is rotated back to the horizontal in the transport column 38 by hinge drives 112 and 114. A fork lift truck then places a filled pallet on assembly 16.

The worker again reaches into frame 12 through the access opening between bottom work position 40 and middle storage position 42 and opening 134 and removes the work parts from plate assembly 18. When all the work parts have been removed from the pallet on plate assembly 18, the worker pushes the pallet off plate assembly 18 and out of frame 12 as before and again activates the drive control.

Figure 18B:
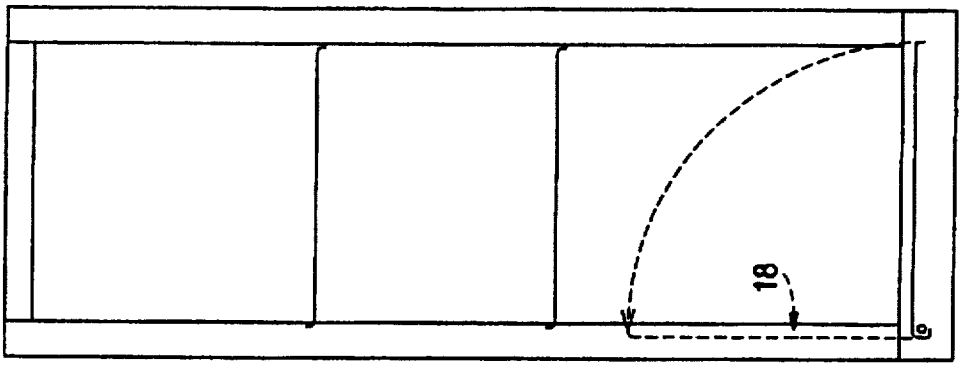
Figure 18A:
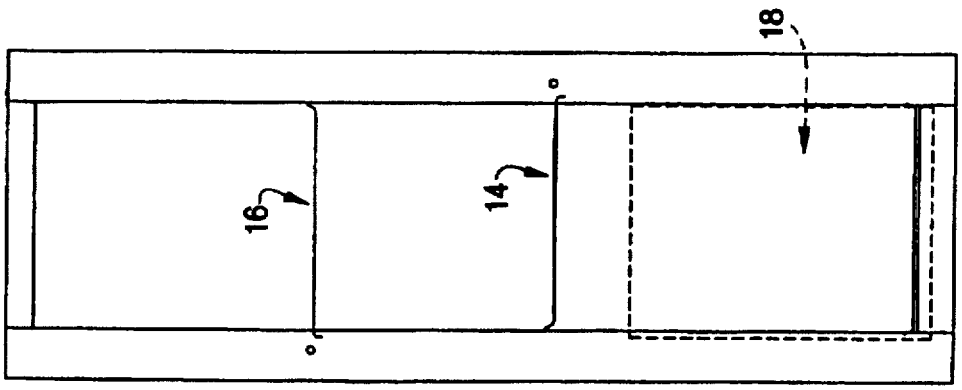

As shown in FIGS. 18A and B, the empty plate of plate assembly 18 is then rotated out of transport column 38 by hinge drives 122 and 124 to the retraced vertical position parallel operator side 30.

Figure 19B:
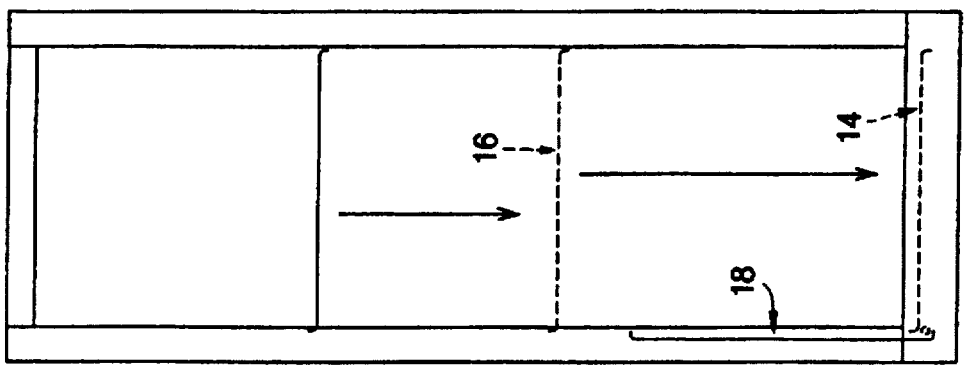
Figure 19A:
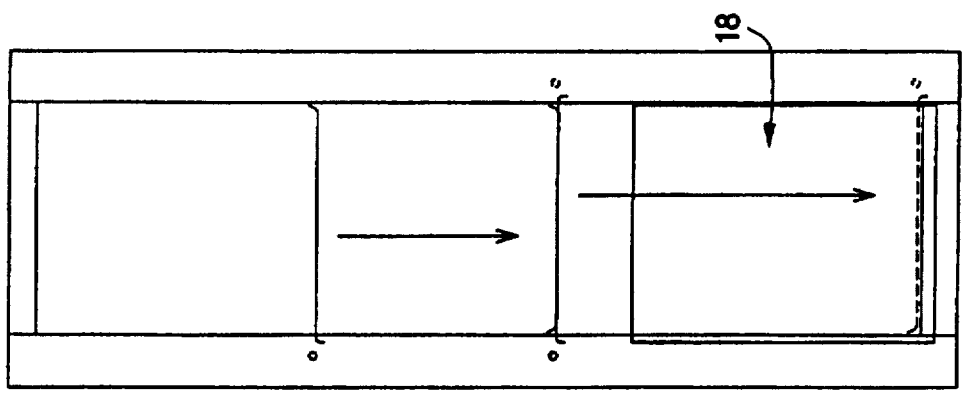

As shown in FIGS. 19A and B, plate assembly 16 is moved down from the top storage position 44 to the middle position 42 and plate assembly 14 is simultaneously moved from middle storage position 42 to bottom work position 40 to resupply work parts to the bottom position.

Figure 20B:
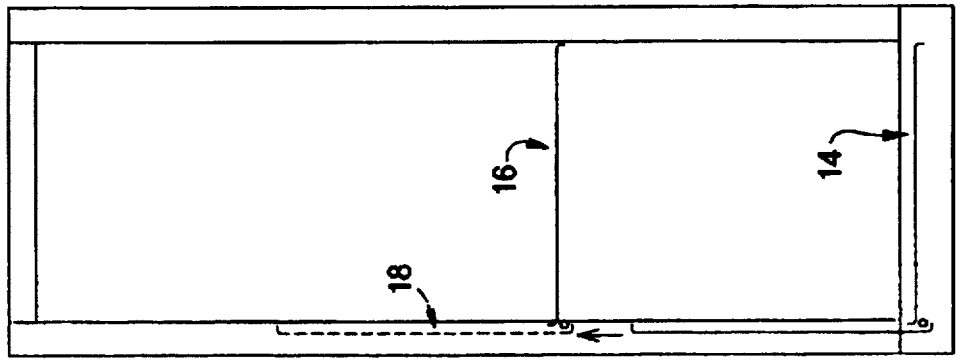
Figure 20A:
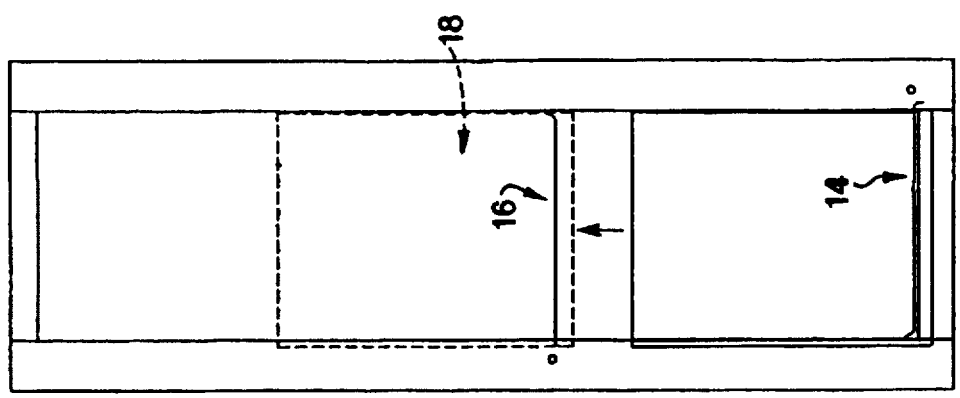

As shown in FIGS. 20A and B, plate assembly 18 is then moved by assembly drive 24 from bottom work position 40 to middle storage position 42 and is held with the plate in the vertical position.

The worker again reaches into frame 12 through the access opening between bottom work position 40 and middle storage position 42 and removes the work parts from plate assembly 14. When all the work parts are removed from plate assembly 14, the worker pushes the pallet off plate assembly 14 out of frame 12 through loading side 32 and again activates the drive control.

Figure 21B:
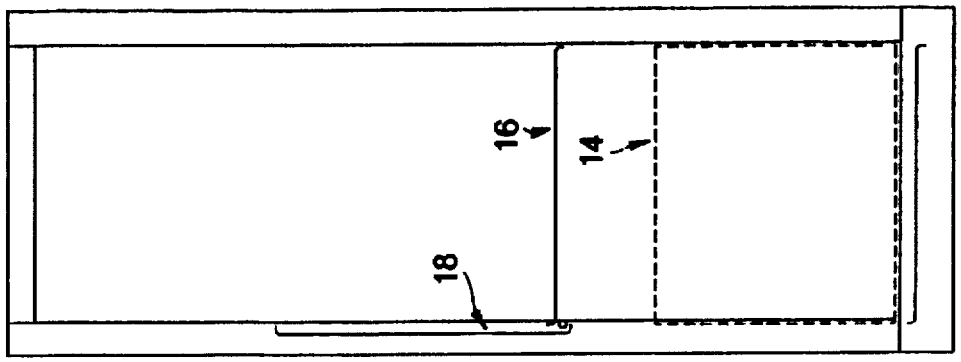
Figure 21A:
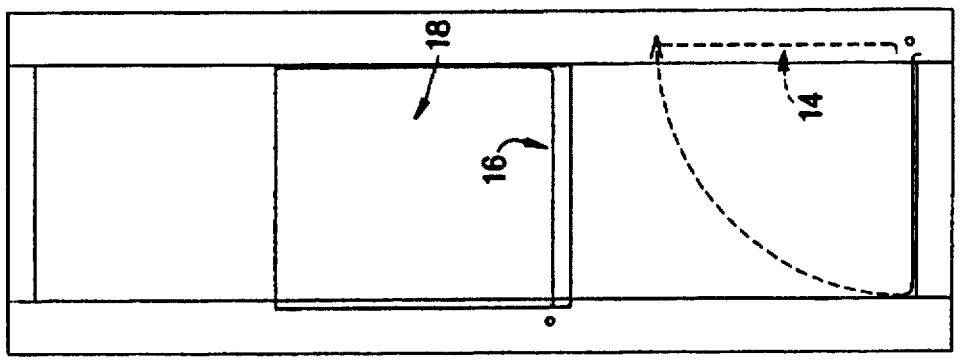
Figure 22B:
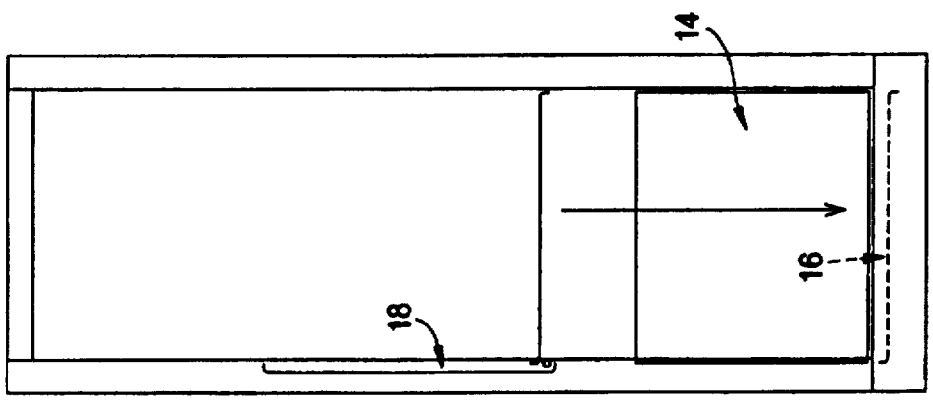
Figure 22A:
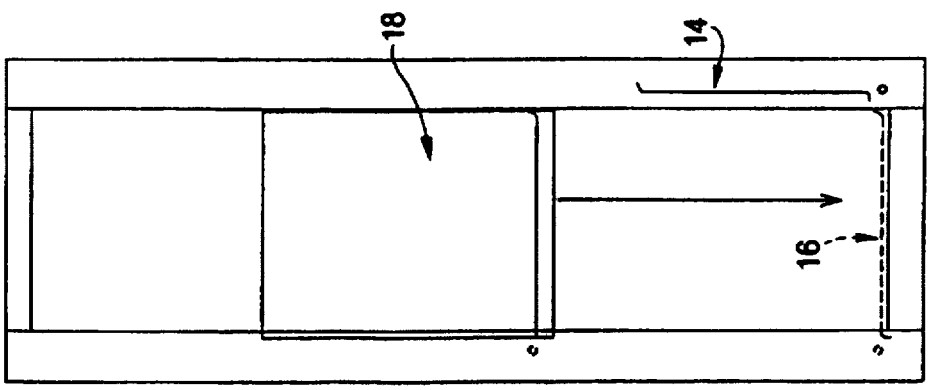

As shown in FIGS. 21A and B, the assembly 14 plate is then rotated out of transport column 38 by hinge drives 62 and 64 to the retraced vertical position parallel to right side 26. As shown in FIGS. 22A and B, plate assembly 16 is then moved by assembly drive 22 from middle storage position 42 to bottom work position 40 to resupply work parts to the bottom position.

Figure 23B:
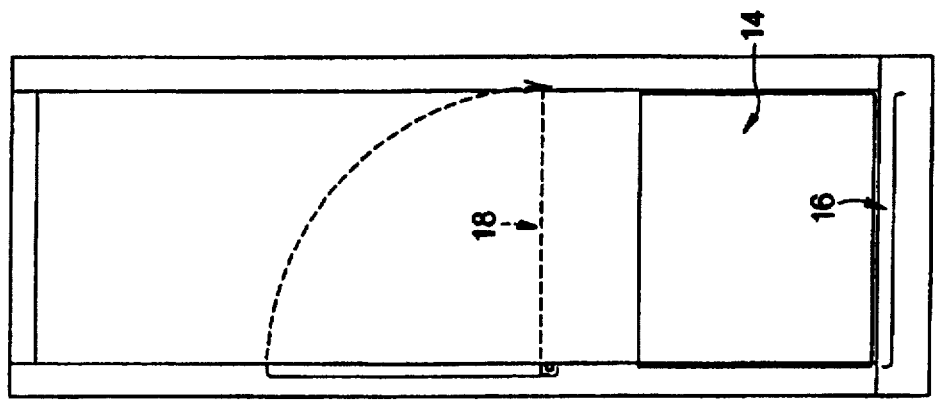
Figure 23A:
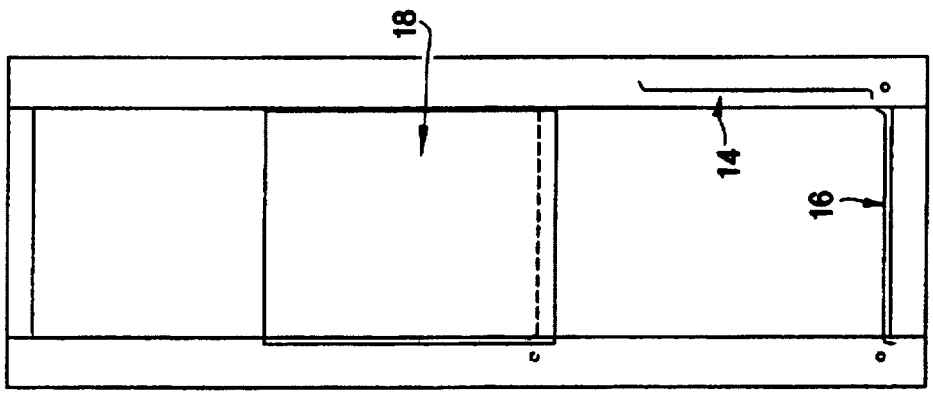

As shown in FIGS. 23A and B, plate assembly 18 is then rotated into transport column 38 at the middle work position 42.

Figure 24B:
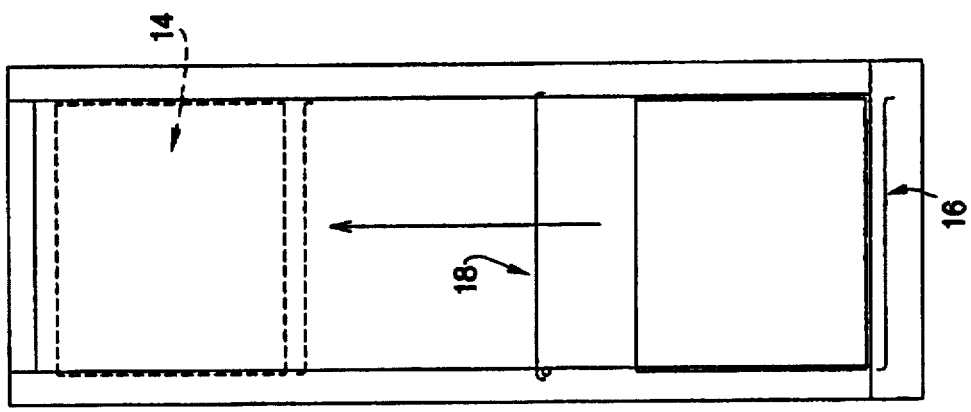
Figure 24A:
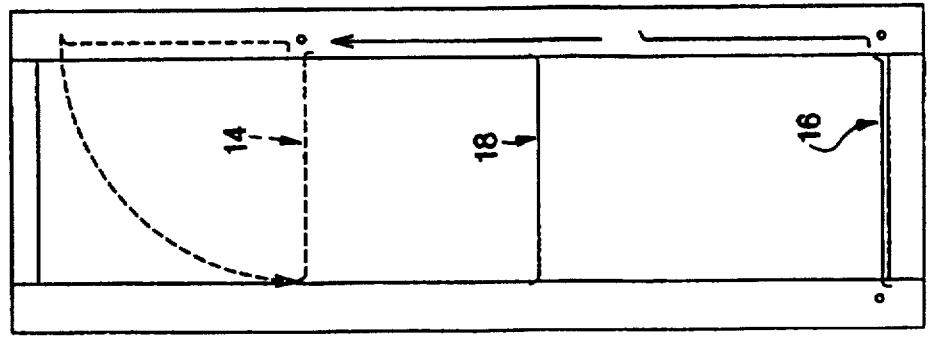

As shown in FIGS. 24A and B, plate assembly 14 is then moved by assembly drive 20 from bottom work position 40 to top storage position 44 and rotated into transport column 38 by hinge drives 62 and 64.

Figure 25B:
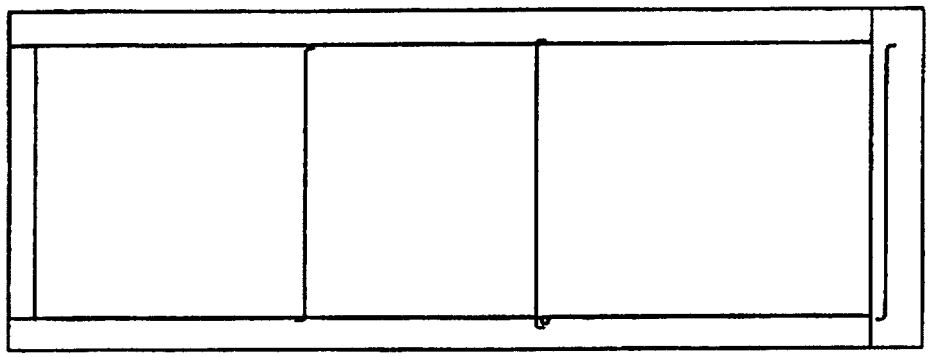
Figure 25A:
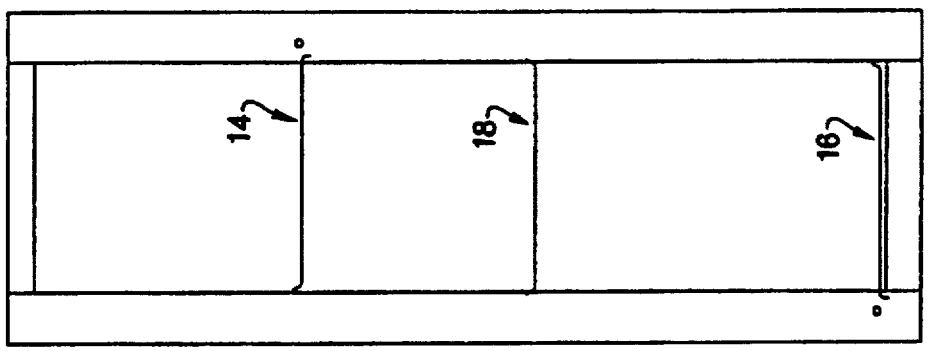

As shown in FIGS. 25A and B, this completes one cycle of operation and plate assemblies 14, 16 and 18 are in there original starting position.

After a plate assembly has been moved from the bottom work position 40 to a storage position 44 or 42 and rotated back into transport column 38, the plate assembly is loaded with work material by a forklift from the loading side.

All the plate assemblies move down column 38 to the bottom position with horizontal plates supporting filled pallets. After the pallets are emptied at the bottom position, the plates are rotated to the vertical outside the column and moved up to elevated positions to receive filled pallets. Assembly 14 and 16 move between all three bottom, middle and top positions. Assembly 18 moves between the bottom and middle positions only.

Apparatus 10 has been described has having a work position and two elevated storage positions. The invention includes transport apparatus with a single storage position for feeding pallets or work to the work position. Additionally, if desired, the apparatus may have more than two storage positions and additional plate assemblies for these positions.

The disclosed work position is located at the bottom of the frame. It is contemplated that the work position may be located at the top of the frame or even in the middle of the frame. In the former case pallets would be conveyed up the frame from a storage position to the work position for unloading. In the latter case, pallets would be conveyed up to the work position from one or more storage positions located below the work position and pallets would be conveyed down to the work position from one or more storage positions located above the work position.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A transport apparatus for moving support plates along a vertical transport column, the apparatus comprising,
    a) a frame adjacent a vertical transport column;
    b) a number of plate assemblies, each plate assembly including a vertically moveable carriage mounted on said frame, a support plate, a hinge connection joining said plate to said carriage, and a hinge drive for rotating the plate between a horizontal load-supporting position extending across the transport column and a vertical position outside and adjacent to one side of the transport column, the plates overlapping each other when in the horizontal positions; and
    c) a plurality of assembly drives each connected between the frame and the carriage of one plate assembly for moving the plate assemblies vertically along the frame.

2. Apparatus as in claim 1 wherein said carriages are located in spaced side-by-side positions on the frame.

3. Apparatus as in claim 2 wherein said frame extends around the column and said carriages are circumferentially spaced on the frame.

4. Apparatus as in claim 3 wherein the axes of said hinge connections extend horizontally and are located outside the column and inside the frame.

5. Apparatus as in claim 4 wherein the frame is rectangular and includes four vertical sides adjacent to the column, and including a vertical connection between each carriage and one side of the frame.

6. Apparatus as in claim 5 wherein the plates are rectangular and have edges spaced a short distance inside from the frame sides when in the horizontal position.

7. Apparatus as in claim 5 wherein each assembly drive includes a power cylinder on a frame side having an extendable rod, a lift head on the rod, a chain having a first end connected to the frame, a second end connected to a carriage and a middle portion wrapped around the lift head, said head being located above such carriage.

8. Apparatus as in claim 6 wherein one plate assembly includes a carriage having a top member, a bottom member and side members joined to the top and bottom members, said members defining a central opening in the carriage, and a connection joining an assembly drive to the top member; and a hinge connection on the bottom member.

9. Apparatus as in claim 5 wherein all of said plate assemblies and assembly drives are located within the frame.

10. Apparatus as in claim 1 wherein each hinge drive is connected to a plate and to a carriage.

11. Transport apparatus for moving objects along a vertical column comprising,
    a) a rectangular frame extending around the column and including four sides;
    b) a plurality of member assemblies, each assembly associated with one frame side and including a vertically movable carriage mounted on such side, a support member, a hinge connecting the member to the carriage, the axis of the hinge extending horizontally and located inside of such side and outside of the column, and a hinge drive operable to rotate the member from a horizontal position in the frame extending across the column to a vertical position between the column and such side; and
    c) an assembly drive associated with each plate assembly for moving the assembly vertically, each assembly drive including a power operator, and a connection between the power operator and a carriage.

12. Apparatus as in claim 11 wherein the members comprise generally rectangular plates substantially extending across the interior of the frame when in the horizontal positions; the edges of such plates defining the sides of the vertical column.

13. Apparatus as in claim 12 wherein one member assembly includes a carriage defining a central opening adjacent one frame side and located above the assembly plate when in the horizontal position.

14. Apparatus as in claim 12 wherein each hinge drive includes two power cylinders.

15. Apparatus as in claim 12 wherein one assembly drive includes a power cylinder on a frame side having an extendable rod, a lift head on the rod, a chain having a first end connected to the frame, a second end connected to a carriage and a middle portion wrapped around the lift head, said head being located above such carriage.

16. Apparatus as in claim 11 wherein each hinge drive is connected to a support member and to a carriage.

17. Apparatus as in claim 11 wherein said hinge drives rotate horizontal support members up to the vertical positions.

18. In a transport apparatus having a frame, a number of plates mounted on the frame for vertical movement along a column located to one side of the frame, the method of moving objects placed on the plates along the column to a work position, comprising the steps of:
    A) placing an object on a horizontal plate when located at a storage position in the column,
    B) moving the horizontal plate and object along the column to the work position,
    C) removing the object from the horizontal plate when located at the work position, and
    D) rotating the empty horizontal plate at the work position to a vertical position located outside of the column, moving the empty vertical plate vertically along the column and then rotating the vertical plate to a horizontal storage position in the column.

19. The method of claim 18 including the steps of rotating the plates about horizontal axes located outside of the column.

20. The method of claim 19 wherein the column includes flat sides, comprising the steps of moving each vertical plate along one column side.

21. The method of claim 20 including the steps of moving the plates to and from a number of different storage positions in the column.

22. The method of claim 20 including the steps of moving each plate vertically between the column and the frame.

23. The method of claim 20 including the steps of rotating each plate up at the work position and rotating each plate down at a storage position.

24. The method of claim 18 including the step of rotating each plate about a different plate axis.

25. The method of claim 18 including the step of moving each vertical plate along a different side of the column.

26. The method of claim 18 including the step of moving a vertical plate past a horizontal plate.

* * * * *

UNITED STATES PATENT AND TRADEMARK OFFICE
CERTIFICATE OF CORRECTION

PATENT : 5,782,317

DATED : July 21, 1998

INVENTOR(S) : David W. Lutz

It is certified that error appears in the above-identified patent and that said Letters Patent is hereby corrected as shown below:

The title page, showing the illustrative figure should be deleted and substitute therefor the attached title page.

In the drawings, Figs. 1 2, 4, 5, 6, 7, 9, 11, 12 and 13, should be deleted and substitute therefor the corrected Figures, as shown on the attached pages.

Signed and Sealed this

Third Day of November, 1998

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,782,317

DATED : July 21, 1998

INVENTOR(S) : David W. Lutz

It is certified that error appears in the above-identified patent and that said Letters Patent is hereby corrected as shown below:

Column 2, line 37, following "Loaded pallets are transfered", insert --down--.

Column 4, line 31, following "between the carriage", change "58" to --56--.

Column 5, line 11, prior to "Extension and retraction", change "126." to -128.--.

Column 5, line 67, following "to the work", change "positions" to --position--.

Column 6, line 50, following "plate assemblies 14, 16 and 18 are in", change "there" to -their--.

United States Patent [19]

Lutz

[11] Patent Number: 5,782,317
[45] Date of Patent: Jul. 21, 1998

[54] TRANSPORT APPARATUS FOR VERTICALLY MOVING OBJECTS AND METHOD

[75] Inventor: David W. Lutz, Carlisle, Pa.

[73] Assignee: Master Manufacturers, Inc., Carlisle, Pa.

[21] Appl. No.: 633,159

[22] Filed: Apr. 16, 1996

[51] Int. Cl.$^6$ ............................................. B66B 9/02
[52] U.S. Cl. ................................. 187/270; 414/222
[58] Field of Search ............................. 187/270, 249, 187/240, 244; 414/222, 225, 226, 750

[56] References Cited

U.S. PATENT DOCUMENTS

| | | | |
|---|---|---|---|
| 2,010,732 | 8/1935 | Mandasic | 271/88 |
| 2,092,430 | 9/1937 | Stratton | 312/184 |
| 3,418,895 | 12/1968 | Palmer | 93/93 |
| 3,447,697 | 6/1969 | Morey et al. | 214/8.5 |
| 3,643,816 | 2/1972 | Jacobsen | 214/6 H |
| 3,876,097 | 4/1975 | Svenson et al. | 214/514 |
| 4,058,225 | 11/1977 | Janson | 214/6 P |
| 4,143,780 | 3/1979 | Schnell | 414/620 |
| 4,277,216 | 7/1981 | Lindberg | 414/331 |
| 4,325,666 | 4/1982 | Chain et al. | 414/24.5 |
| 4,373,846 | 2/1983 | Charbonnet | 414/331 |
| 4,405,186 | 9/1983 | Sandberg et al. | 414/21 |
| 4,460,169 | 7/1984 | Bartesaghi | 271/192 |
| 4,557,656 | 12/1985 | Ouellette | 414/43 |
| 4,588,341 | 5/1986 | Motoda | 414/32 |
| 4,687,403 | 8/1987 | Motoda | 414/32 |
| 4,946,340 | 8/1990 | Murphy | 414/788.8 |
| 5,020,382 | 6/1991 | Lutz | 74/89.2 |
| 5,096,369 | 3/1992 | Ouellette | 414/788.7 |
| 5,180,277 | 1/1993 | Pearce et al. | 414/792.7 |
| 5,190,434 | 3/1993 | Miura et al. | 414/609 |
| 5,207,727 | 5/1993 | Pearce et al. | 414/792.7 |
| 5,310,305 | 5/1994 | Lutz | 414/609 |
| B1 4,557,656 | 12/1989 | Ouellette | 414/790.8 |

FOREIGN PATENT DOCUMENTS

| 1238843 | 6/1964 | Germany . |
| 270796 | 10/1993 | Japan . |

OTHER PUBLICATIONS

Electrolux, H1–Lift Order Pickers, Mar. 1990 Materials Handling, p. 20.

Joyce, Materialift LC Series Vertical Reciprocating Conveyors.

*Primary Examiner*—Kenneth Noland
*Attorney, Agent, or Firm*—Thomas Hooker, P.C.

[57] ABSTRACT

A Transport apparatus includes a vertically extending frame, three plate assemblies mounted on the frame and three assembly drives connected to the plate assemblies for vertically moving the plate assemblies in the frame. The frame surrounds a transport column which includes a bottom work position, a middle storage position and a top storage position. Each plate assembly includes a carriage adjacent a side of the frame, a rectangular plate, a hinge between the carriage and plate and a pair of hinge drives for rotating the plate between a horizontal load supporting position in the transport column and a vertical position adjacent the column. The assemblies are lowered to the under position with horizontal plates supporting pallets filled with work parts. After the work parts and pallets are removed, the plates are rotated to the vertical and moved up to storage positions.

26 Claims, 16 Drawing Sheets

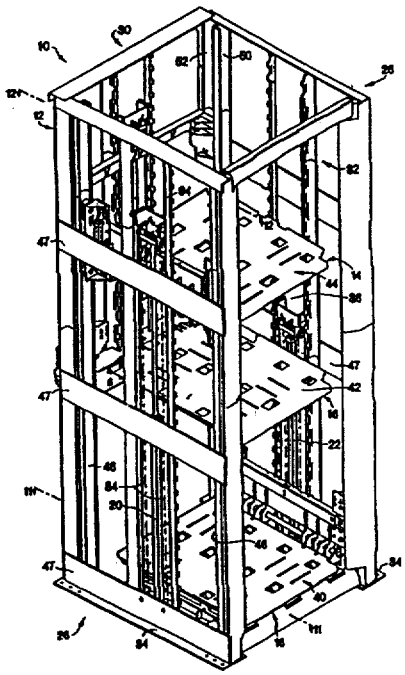

UNITED STATES PATENT AND TRADEMARK OFFICE
CERTIFICATE OF CORRECTION

PATENT NO. : 5,782,317

DATED : July 21, 1998

INVENTOR(S) : David W. Lutz

Page 4 of 13

It is certified that error appears in the above-identified patent and that said Letters Patent is hereby corrected as shown below:

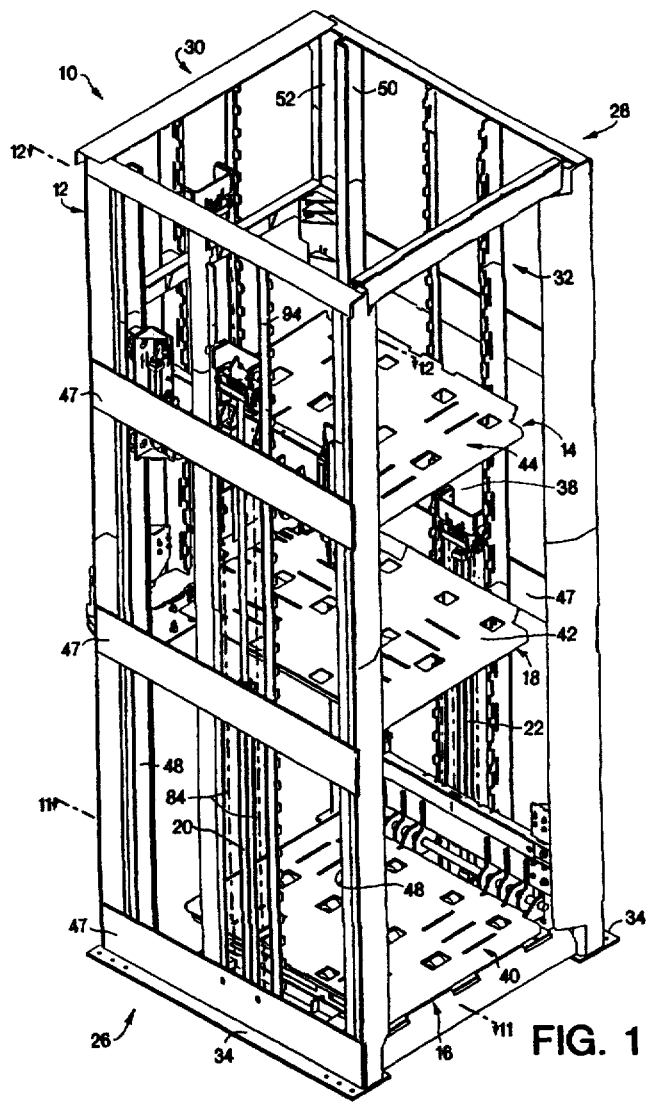

FIG. 1

UNITED STATES PATENT AND TRADEMARK OFFICE
CERTIFICATE OF CORRECTION

PATENT NO. : 5,782,317                    Page 5 of 13

DATED       : July 21, 1998

INVENTOR(S) : David W. Lutz

It is certified that error appears in the above-identified patent and that said Letters Patent is hereby corrected as shown below:

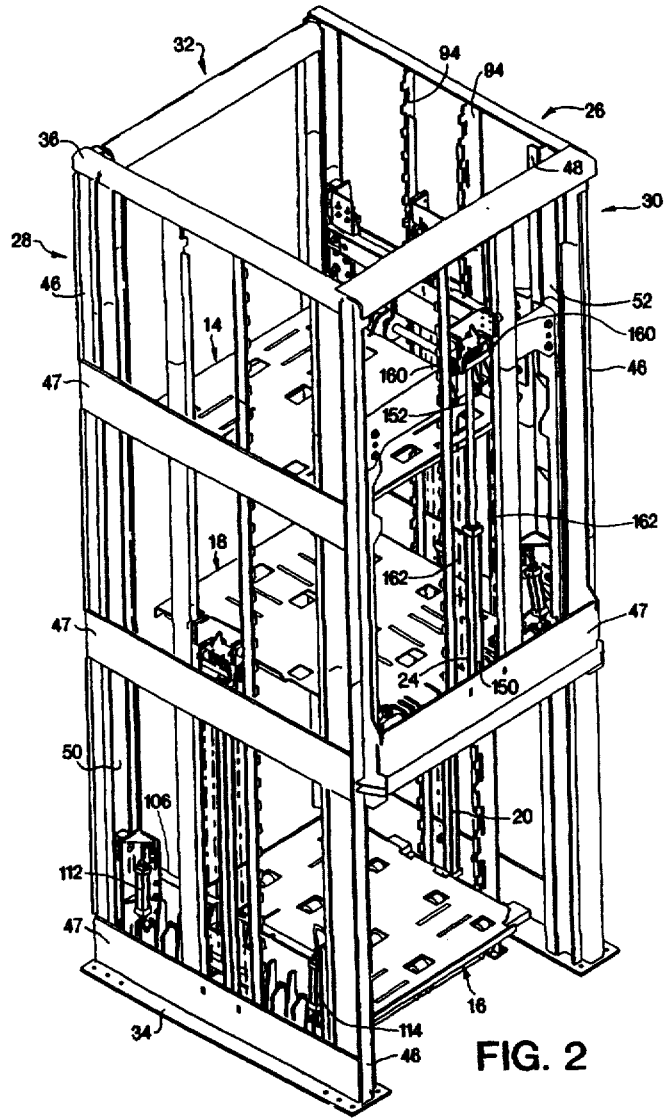

FIG. 2

UNITED STATES PATENT AND TRADEMARK OFFICE
CERTIFICATE OF CORRECTION

PATENT NO. : 5,782,317

DATED : July 21, 1998

INVENTOR(S) : David W. Lutz

It is certified that error appears in the above-identified patent and that said Letters Patent is hereby corrected as shown below:

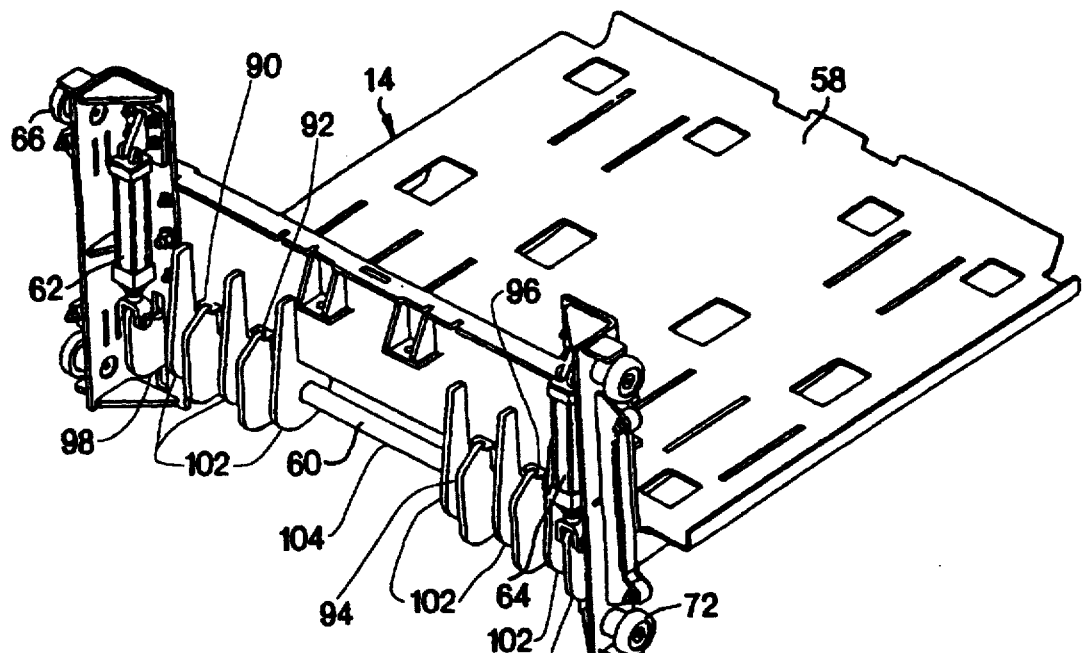

FIG. 4

UNITED STATES PATENT AND TRADEMARK OFFICE
CERTIFICATE OF CORRECTION

PATENT NO. : 5,782,317

DATED : July 21, 1998

INVENTOR(S) : David W. Lutz

It is certified that error appears in the above-identified patent and that said Letters Patent is hereby corrected as shown below:

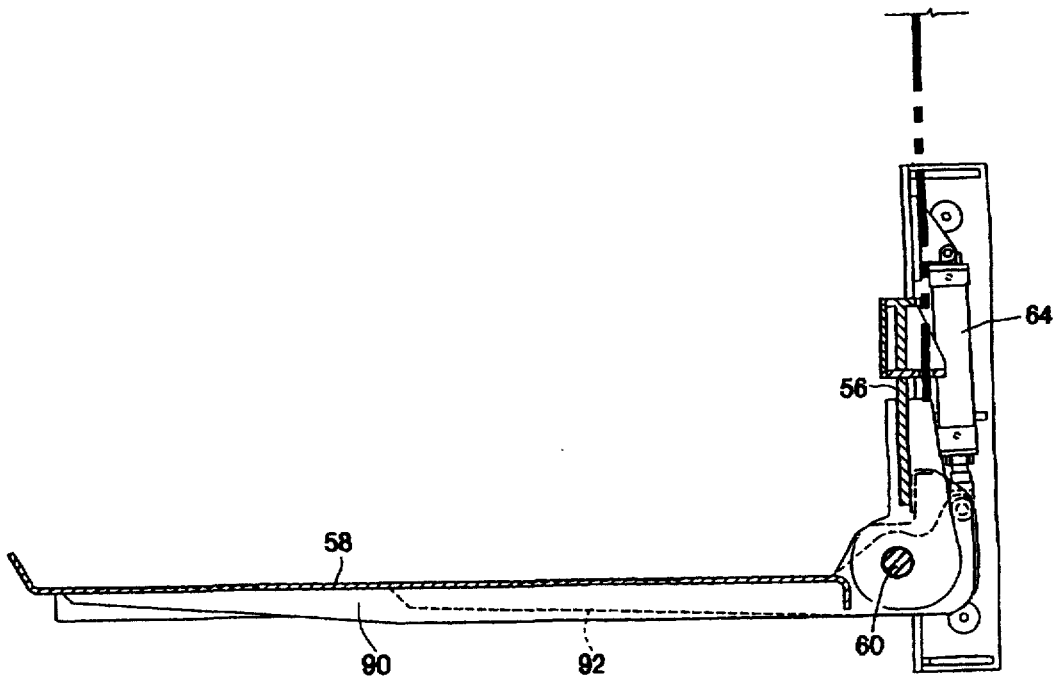

FIG. 5

UNITED STATES PATENT AND TRADEMARK OFFICE
CERTIFICATE OF CORRECTION

PATENT NO. : 5,782,317

Page 8 of 13

DATED : July 21, 1998

INVENTOR(S) : David W. Lutz

It is certified that error appears in the above-identified patent and that said Letters Patent is hereby corrected as shown below:

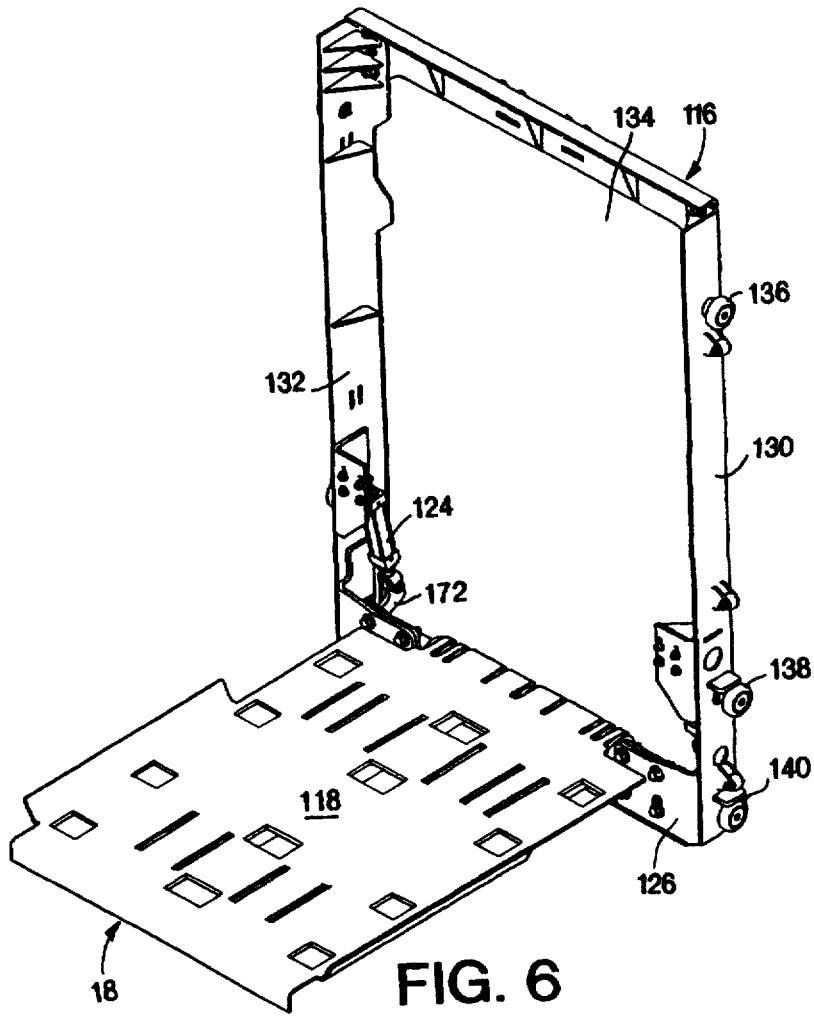

FIG. 6

UNITED STATES PATENT AND TRADEMARK OFFICE
CERTIFICATE OF CORRECTION

PATENT NO. : 5,782,317

DATED : July 21, 1998

INVENTOR(S) : David W. Lutz

It is certified that error appears in the above-identified patent and that said Letters Patent is hereby corrected as shown below:

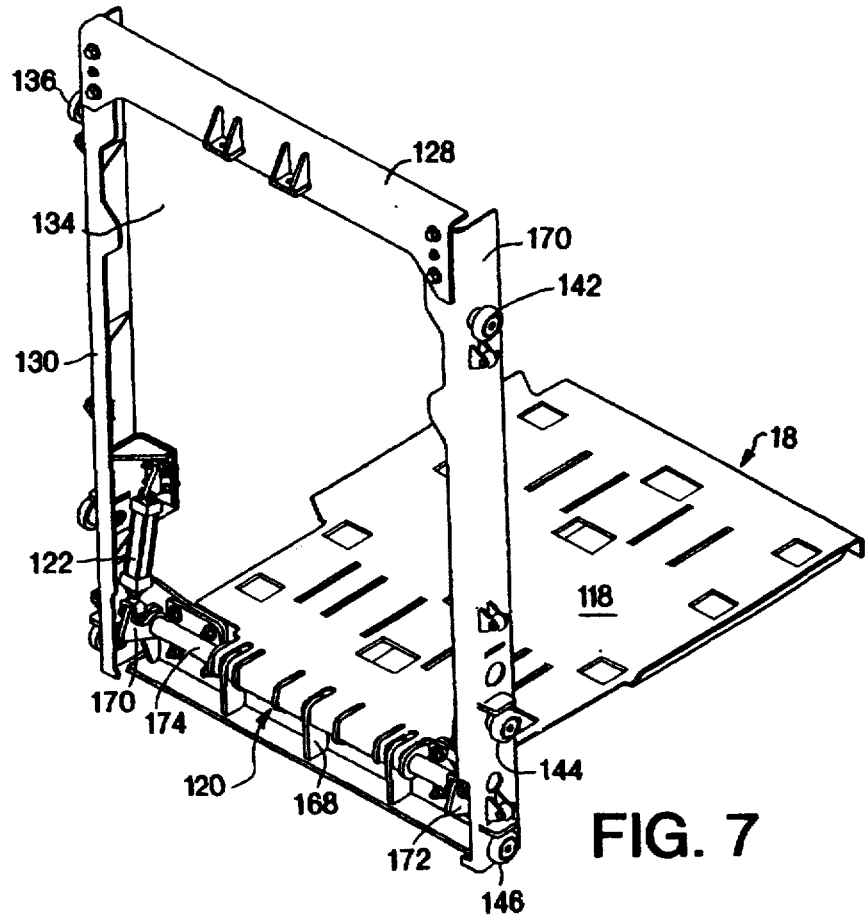

FIG. 7

UNITED STATES PATENT AND TRADEMARK OFFICE
CERTIFICATE OF CORRECTION

Page 10 of 13

PATENT NO. : 5,782,317

DATED : July 21, 1998

INVENTOR(S) : David W. Lutz

It is certified that error appears in the above-identified patent and that said Letters Patent is hereby corrected as shown below:

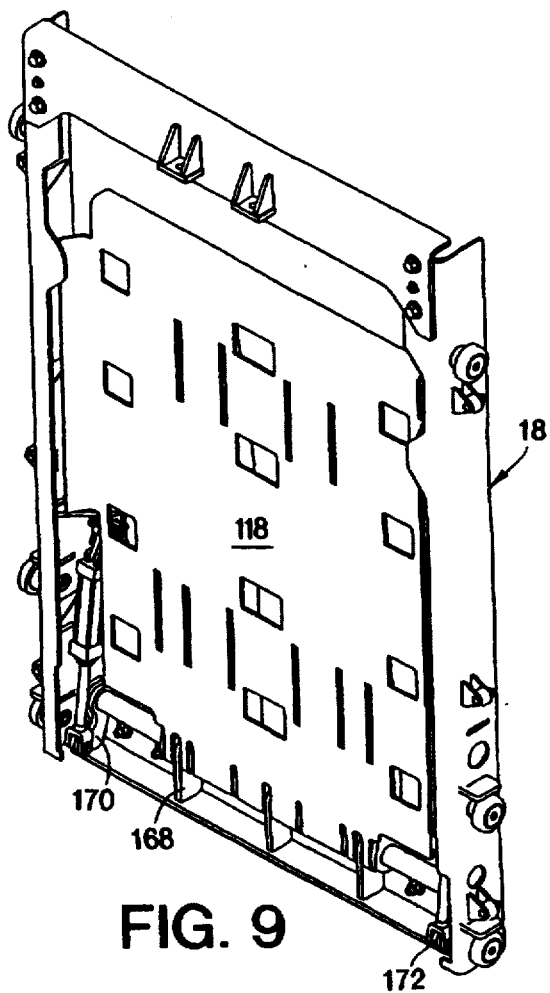

FIG. 9

UNITED STATES PATENT AND TRADEMARK OFFICE
CERTIFICATE OF CORRECTION

PATENT NO. : 5,782,317

DATED : July 21, 1998

INVENTOR(S) : David W. Lutz

Page 11 of 13

It is certified that error appears in the above-identified patent and that said Letters Patent is hereby corrected as shown below:

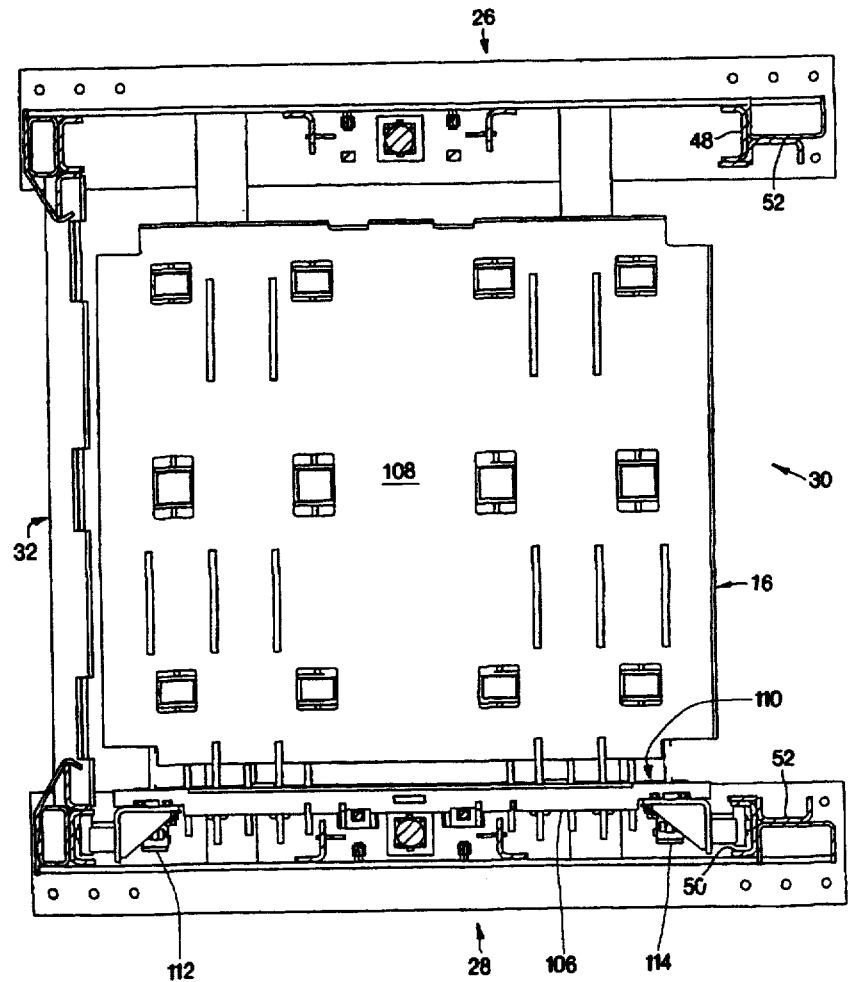

FIG. 11

UNITED STATES PATENT AND TRADEMARK OFFICE
CERTIFICATE OF CORRECTION

PATENT NO. : 5,782,317

DATED : July 21, 1998

INVENTOR(S) : David W. Lutz

It is certified that error appears in the above-identified patent and that said Letters Patent is hereby corrected as shown below:

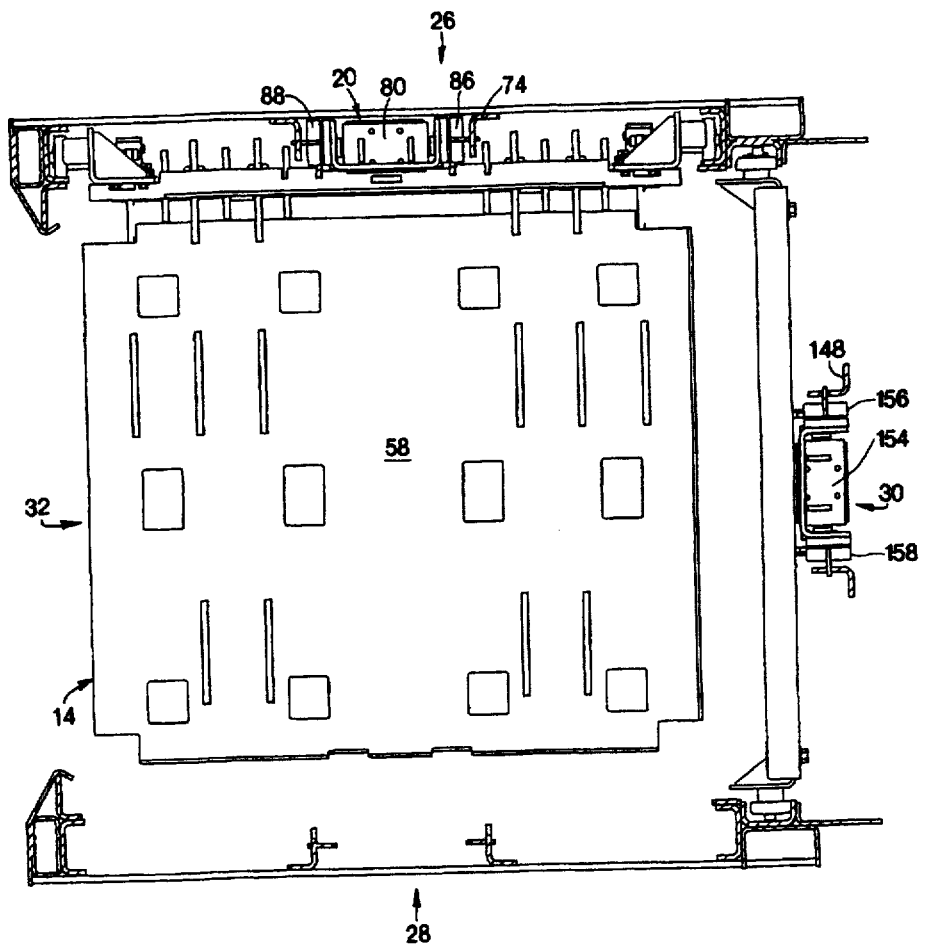

FIG. 12

UNITED STATES PATENT AND TRADEMARK OFFICE
CERTIFICATE OF CORRECTION

PATENT NO. : 5,782,317

Page 13 of 13

DATED : July 21, 1998

INVENTOR(S): David W. Lutz

It is certified that error appears in the above-identified patent and that said Letters Patent is hereby corrected as shown below:

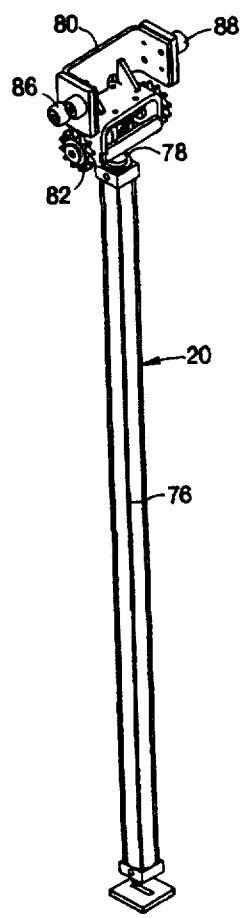

FIG. 13